United States Patent
Kato et al.

(10) Patent No.: US 10,542,563 B2
(45) Date of Patent: Jan. 21, 2020

(54) RADIO COMMUNICATION SYSTEM, TERMINAL DEVICE, BASE STATION DEVICE, RADIO COMMUNICATION METHOD, AND INTEGRATED CIRCUIT WITH EFFICIENT TRANSMISSION AND RECEPTION THROUGH REPETITION

(71) Applicant: Sharp Kabushiki Kaisha, Sakai, Osaka (JP)

(72) Inventors: Yasuyuki Kato, Sakai (JP); Shohei Yamada, Sakai (JP); Katsunari Uemura, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/562,918

(22) PCT Filed: Apr. 1, 2016

(86) PCT No.: PCT/JP2016/060969
§ 371 (c)(1),
(2) Date: Sep. 29, 2017

(87) PCT Pub. No.: WO2016/159373
PCT Pub. Date: Oct. 6, 2016

(65) Prior Publication Data
US 2018/0084578 A1 Mar. 22, 2018

(30) Foreign Application Priority Data
Apr. 3, 2015 (JP) .................... 2015-076398

(51) Int. Cl.
*H04W 74/00* (2009.01)
*H04W 4/70* (2018.01)
*H04W 74/08* (2009.01)

(52) U.S. Cl.
CPC ........... *H04W 74/008* (2013.01); *H04W 4/70* (2018.02); *H04W 74/006* (2013.01); *H04W 74/0858* (2013.01)

(58) Field of Classification Search
CPC ....... H04W 74/00; H04W 4/00; H04W 74/08; H04W 4/70; H04W 74/006; H04W 74/0858; H04W 74/008; H04W 74/0833
See application file for complete search history.

(56) References Cited

U.S. PATENT DOCUMENTS

| | | | | |
|---|---|---|---|---|
| 2012/0002555 A1* | 1/2012 | Ohuchi | ................. | H04W 24/08 370/244 |
| 2015/0016312 A1* | 1/2015 | Li | ..................... | H04W 74/0833 370/280 |
| 2015/0117233 A1* | 4/2015 | Wong | ..................... | H04W 4/70 370/252 |

FOREIGN PATENT DOCUMENTS

WO 2010/103895 A1 9/2010

OTHER PUBLICATIONS

Official Communication issued in International Patent Application No. PCT/JP2016/060969, dated May 10, 2016.
(Continued)

*Primary Examiner* — Kyaw Z Soe
(74) *Attorney, Agent, or Firm* — Keating & Bennett, LLP

(57) ABSTRACT

Disclosed is a radio communication system in which a base station device and a terminal device communicate with each other, and the terminal device performs a random access procedure. The base station device notifies the terminal device of random access common configuration information including the number of repetitions for each level, information indicating a relationship between group information of random access preambles and the level, and the number of attempts of preamble transmission for each level. A MAC layer in the terminal device performs processing of increas-
(Continued)

ing the level in a case that a first counter exceeds the number of attempts of transmission corresponding to the level.

10 Claims, 13 Drawing Sheets

(56) References Cited

OTHER PUBLICATIONS

Huawei et al., "WF on PRACH CE Procedure", 3GPP TSG RAN WG1 #80, R1-150877, Feb. 9-13, 2015, 4 pages.
Sharp, "PRACH coverage enhancement for ReI-13 MTC UEs", 3GPP TSG RAN WG1 Meeting #80, R1-150275, Feb. 9-13, 2015, pp. 1-5.
Ericsson, "ReI-12 agreements for MTC", 3GPP TSG-RAN WG1 Meeting #78bis, R1-143784, Oct. 6-10, 2014, pp. 1-7.
"3rd Generation Partnership Project; Technical Specification Group Radio Access Network; Study on provision of low-cost Machine-Type Communications (MTC) User Equipments (UEs) based on LTE (Release 12)", 3GPP TR 36.888 V12.0.0, Jun. 2013, pp. 1-55.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.5.0, Mar. 2013, pp. 1-209.

\* cited by examiner

RADIO COMMUNICATION SYSTEM, TERMINAL DEVICE, BASE STATION DEVICE, RADIO COMMUNICATION METHOD, AND INTEGRATED CIRCUIT WITH EFFICIENT TRANSMISSION AND RECEPTION THROUGH REPETITION

TECHNICAL FIELD

The present invention relates to a radio communication system, a terminal device, and a base station device, and more specifically relates to a technology for a radio communication system, a base station device, a terminal device, a radio communication method, and an integrated circuit which are directed to machine type communication or machine to machine communication.

This application claims priority based on JP 2015-076398 filed on Apr. 3, 2015, the contents of which are incorporated herein by reference.

BACKGROUND ART

In the 3rd Generation Partnership Project (3GPP), a W-CDMA scheme has been standardized as a third generation cellular mobile communication scheme to provide a service. HSDPA with a higher communication speed has been also standardized to provide a service.

On the other hand, in 3GPP, the advance of the third generation radio access (Long Term Evolution (LTE) or Evolved Universal Terrestrial Radio Access (EUTRA)) has been also standardized to start a LTE service. As a downlink communication scheme in LTE, used is the orthogonal frequency division multiplexing (OFDM) scheme resistant to a multipath interference and suitable for a high-speed transmission. As an uplink communication scheme, taking into account a cost and power consumption of a mobile station device, discrete Fourier transform (DFT)-spread OFDM scheme for a single carrier-frequency division multiple access (SC-FDMA) is employed which can reduce a peak to average power ratio (PAPR) of a transmit signal.

In 3GPP, LTE-Advanced (or advanced-EUTRA) that is further advanced from LTE has also been continuously studied. In LTE-Advanced, it is assumed that a band having the maximum bandwidth of 100 MHz is used in each of an uplink and a downlink to perform communication at a transmission rate of 1 Gbps or greater in the downlink and 500 Mbps or greater in the uplink at a maximum.

In LTE-Advanced, it has been considered that multiple bands compatible with LTE are aggregated such that a mobile station device of LTE can be also accommodated to attain the maximum band of 100 MHz. In LTE-Advanced, one band of 20 MHz or less in LTE is referred to as a component carrier (CC). The component carrier is also referred to as a cell. Aggregating of the bands of 20 MHz or less is referred to as carrier aggregation (CA) (NPL 1).

On the other hand, in LTE-Advanced, cost reduction has been studied for a mobile station device supporting a specific category such as machine type communication (MTC) or machine to machine communication (M2M) (NPL 2). Hereinafter, an MTC/M2M mobile station device or an MTC/M2M communication device is also referred to as a machine type communication user equipment (MTCUE).

In order to attain a low-cost MTCUE complying with the LTE standard and the LTE-Advanced standard, there has been proposed a cost reduction method including narrowing a transmission and reception bandwidth, reduction in the number of antenna ports/the number of RF chains, reduction in a transmitted and received data transfer rate, employment of a half-duplex frequency division duplex mode, reduction in transmit and receive power, and extension of a discontinuous reception interval. In addition, there has also been suggested that reduction of maximum bandwidth is effective in a transmission and reception RF circuit and transmission and reception baseband circuit of the MTCUE as a method in order to attain a low-cost MTCUE.

In the MTC, coverage enhancement has been studied for enhancing a transmission and reception coverage of the MTCUE, in addition to the study for the cost reduction. In order to enhance the coverage, it has been considered that a base station device repeatedly transmits downlink data or downlink signals to the MTCUE, and the MTCUE repeatedly transmits uplink data or uplink signals to the base station device (NPL 3).

For example, the base station device repeatedly transmits a physical broadcast channel (PBCH) to the MTCUE multiple times within 40 ms. In a random access procedure, the MTCUE repeatedly transmits the same random access preamble using multiple physical random access channels (PRACHs). The base station device having received the random access preamble repeatedly transmits a random access response message. The base station device notifies the MTCUEs in a cell using a broadcast channel (BCH) or individually notifies each MTCUE of the number of repetitions (NPL 3).

For example, the number of repetitive transmissions of the random access preamble or the number of repetitive transmissions of the random access response message is notified using the broadcast channel (BCH). It has also been studied that the number of repetitive transmissions of the random access preamble includes multiple kinds of the numbers of repetitive transmissions such that the MTCUE can select one number of repetitive transmissions from the multiple kinds of the numbers of repetitive transmissions.

CITATION LIST

Non Patent Literature

NPL 1: 3GPP TS (Technical Specification) 36.300, V11.5.0 (2013-03), Evolved Universal Terrestrial Radio Access (E-UTRA) and Evolved Universal Terrestrial Radio Access Network (E-UTRAN), Overall description Stage 2.

NPL 2: 3GPP TR (Technical Report) 36.888, V12.0.0 (2013-06), Study on provision of low-cost Machine-Type Communications (MTC) User Equipments (UEs) based on LTE (release 12).

NPL 3: "Rel-12 agreements for MTC", R1-143784, 3GPP TSG-RAN WG1 Meeting #78bis Ljubljana, Slovenia, 6th-10th October 20144.

SUMMARY OF INVENTION

Technical Problem

However, transmission control through repetition (or reception control through repetition) is needed to be correctly managed between a terminal device and a base station device. For example, upon an occurrence of a mismatch between the number of repetitions in a terminal device and the number of repetitions in a base station device, either of the devices may not receive in some cases.

The present invention relates to a radio communication system, a base station device, a terminal device, a radio communication method, and an integrated circuit for the terminal device and the base station device to efficiently perform transmission and reception through repetition.

Solution to Problem (1) A radio communication system according to an aspect of the present invention is a radio communication system in which a base station device and a terminal device are configured to communicate with each other and, the terminal device is configured to perform a random access procedure, the base station device being configured to notify the terminal device of random access common configuration information including the number of repetitions for each level, information indicating a relationship between group information of random access preambles and the level, and the number of attempts of preamble transmission for each level, and a MAC layer in the terminal device being configured to perform processing of increasing the level in a case that a first counter exceeds the number of attempts of transmission corresponding to the level.

(2) A terminal device according to an aspect of the present invention is a terminal device configured to communicate with a base station device and perform a random access procedure, the terminal device being configured to, receive, from the base station device, random access common configuration information including the number of repetitions for each level, information indicating a relationship between group information of random access preambles and the level, and the number of attempts of preamble transmission for each level, and a MAC layer in the terminal device being configured to increase the level in a case that a first counter exceeds the number of attempts of transmission corresponding to the level.

(3) A base station device according to an aspect of the present invention is a base station device configured to communicate with a terminal device, the base station device being configured to notify the terminal device of random access common configuration information including the number of repetitions for each level, information indicating a relationship between group information of random access preambles and the level, and the number of attempts of preamble transmission for each level, and assume that the level for the terminal device varies depending on the number of attempts of transmission corresponding to the level, and a success or failure in receiving a random access response by the terminal device.

(4) A radio communication method according to an aspect of the present invention is a radio communication method applied to a terminal device, the terminal device being configured to communicate with a base station device and perform a random access procedure, the radio communication method including the steps of receiving, from the base station device, random access common configuration information including the number of repetitions for each level, information indicating a relationship between group information of random access preambles and the level, and the number of attempts of preamble transmission for each level, and increasing the level by a MAC layer in the terminal device in a case that a first counter exceeds the number of attempts of transmission corresponding to the level.

(5) A radio communication method according to an aspect of the present invention is a radio communication method applied to a base station device configured to communicate with a terminal device, the radio communication method further including, at the base station device, notifying, the terminal device of random access common configuration information including the number of repetitions for each level, information indicating a relationship between group information of random access preambles and the level, and the number of attempts of preamble transmission for each level, and assuming that the level for the terminal device varies depending on the number of attempts of transmission corresponding to the level, and a success or failure in receiving a random access response by the terminal device.

(6) A integrated circuit according to an aspect of the present invention is an integrated circuit applied to a terminal device configured to communicate with a base station device and perform a random access procedure, the integrated circuit including a first unit configured to receive, from the base station device, random access common configuration information including the number of repetitions for each level, information indicating a relationship between group information of random access preambles and the level, and the number of attempts of preamble transmission for each level, and a second unit configured to increase the level in a case that a first counter exceeds the number of attempts of transmission corresponding to the level.

Advantageous Effects of Invention

According to some aspects of the present invention, it is possible to cause a terminal device to perform a random access procedure using efficient repetitive transmission and reception control. Moreover, a base station device can perform efficient data scheduling for a terminal device.

DESCRIPTION OF EMBODIMENTS

An OFDM scheme is employed for a downlink in LTE. A single carrier communication scheme using a DFT-spread OFDM scheme is employed for an uplink in LTE.

Figure 7:
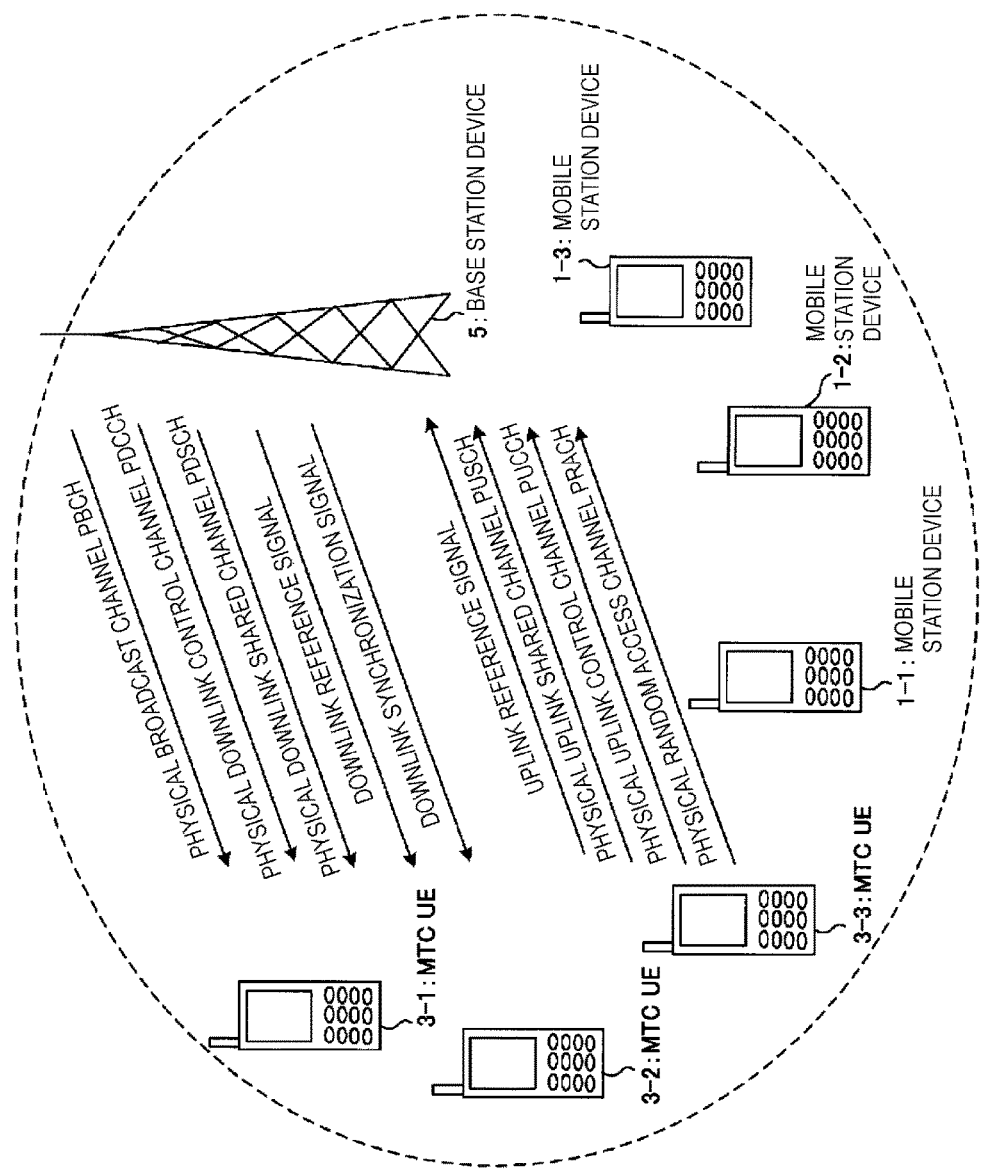
FIG. 7 is a diagram illustrating a physical channel configuration example in LTE.

FIG. 7 is a diagram illustrating a physical channel configuration in LTE. Downlink physical channels are consisted of a physical downlink shared channel (PDSCH), a physical downlink control channel (PDCCH), and a physical broadcast channel (PBCH). Other than such downlink physical channels, a downlink synchronization signal and a downlink reference signal are used as physical signals (NPL 1).

Uplink physical channels are consisted of a physical random access channel (PRACH), a physical uplink shared channel (PUSCH), and a physical uplink control channel (PUCCH). Other than such uplink physical channels, an uplink reference signal is used as a physical signal. The uplink reference signal includes a demodulation reference signal (DRS) and a sounding reference signal (SRS). The sounding reference signal includes, more specifically, a periodic sounding reference signal (periodic SRS) and an aperiodic sounding reference signal (aperiodic SRS). Hereinafter, the sounding reference signal refers to the periodic sounding reference signal unless otherwise specified (NPL 1).

Figure 8:
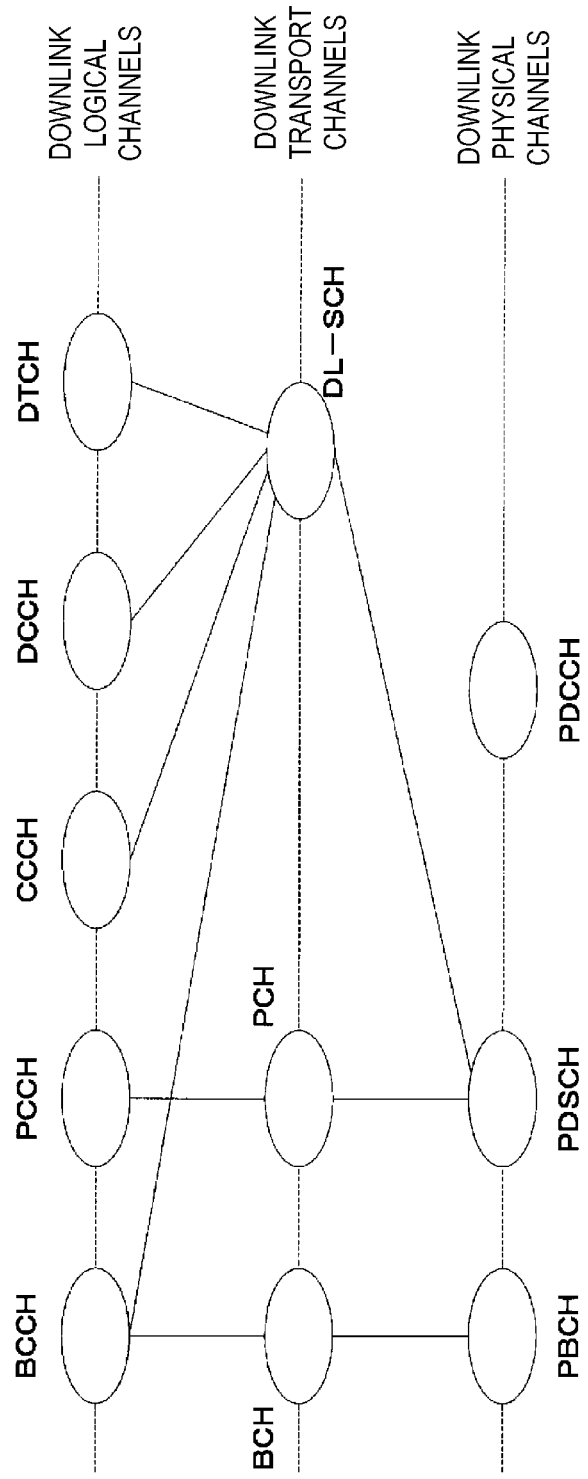
FIG. 8 is a diagram illustrating a downlink channel configuration example in LTE.

FIG. 8 is a diagram illustrating a downlink channel configuration in LTE. Each of downlink channels illustrated in FIG. 8 is consisted of logical channels, transport channels, and physical channels. The logical channels define a type of data transmission service in which data is transmitted and received in a medium access control (MAC) layer. The transport channels define what characteristics the data transmitted via a radio interface has and how the data is transmitted. The physical channels are physical channels carrying the data which is transported to a physical layer via the transport channels.

The downlink logical channels include a broadcast control channel (BCCH), a paging control channel (PCCH), a common control channel (CCCH), a dedicated control channel (DCCH), and a dedicated traffic channel (DTCH).

The downlink transport channels include a broadcast channel (BCH), a paging channel (PCH), and a downlink shared channel (DL-SCH).

The downlink physical channels include a physical broadcast channel (PBCH), a physical downlink control channel (PDCCH), and a physical downlink shared channel (PDSCH). These channels are transmitted and received between a base station device and a mobile station.

Next, the logical channels are described. The broadcast control channel (BCCH) is a downlink channel used to broadcast system information. The paging control channel (PCCH), which is a downlink channel used to transmit paging information, is used when a network does not know a cell location of the mobile station device. The common control channel (CCCH), which is a channel used to transmit control information between the mobile station device and the network, is used by a mobile station device not having a radio resource control (RRC) connection with the network.

The dedicated control channel (DCCH), which is a point-to-point bidirectional channel, is used to transmit individual control information between the mobile station device and the network. The dedicated control channel (DCCH) is used by a mobile station device having an RRC connection. The dedicated traffic channel (DTCH), which is a point-to-point bidirectional channel and is a channel dedicated to single mobile station device, is used to transfer user information (unicast data).

Next, the transport channels are described. The broadcast channel (BCH) is broadcasted to the entire cell in a fixed or predefined transmission manner. The downlink shared channel (DL-SCH) supports a hybrid automatic repeat request (HARQ), dynamic adaptation radio link control, and discontinuous reception (DRX), and is broadcasted to the entire cell.

The paging channel (PCH) supports the DRX, and needs to be broadcasted to the entire cell. The paging channel (PCH) is mapped to a physical resource which is dynamically used with respect to a traffic channel or other control channels, more specifically, the physical downlink shared channel (PDSCH).

Next, the physical channels are described. The physical broadcast channel (PBCH) maps the broadcast channel (BCH) in a 40-millisecond cycle. The physical downlink control channel (PDCCH) is a channel used to notify the mobile station device of radio resource assignment (downlink assignment) of the physical downlink shared channel (PDSCH), a hybrid automatic repeat request (HARQ) information for the downlink data, and an uplink grant that is radio resource assignment of the physical uplink shared channel (PUSCH). The physical downlink shared channel (PDSCH) is a channel used to transmit the downlink data or the paging information.

The physical downlink control channel (PDCCH) is allocated on 1st to 3rd symbol OFDMs from a head of a resource block in one subframe, and the physical downlink shared channel (PDSCH) is allocated on the rest of the OFDM symbols. One subframe includes two resource blocks, and one frame includes 10 subframes. One resource block includes 12 subcarriers and seven OFDM symbols.

In a case that the base station device notifies the mobile station device of the radio resource assignment of the physical downlink shared channel (PDSCH) on the physical downlink control channel (PDCCH) to the mobile station, a region of the physical downlink shared channel (PDSCH) assigned to the mobile station device is the physical downlink shared channel (PDSCH) in the same subframe as the physical downlink control channel (PDCCH) used to notify the downlink assignment.

Next, channel mapping is described. As illustrated in FIG. 8, in the downlink, the transport channels are mapped to the physical channels as below. The broadcast channel (BCH) is mapped to the physical broadcast channel (PBCH). The paging channel (PCH) and the downlink shared channel (DL-SCH) are mapped to the physical downlink shared channel (PDSCH). The physical downlink control channel (PDCCH) is used as the dedicated physical channels.

In the downlink, the logical channels are mapped to the transport channels as below. The paging control channel (PCCH) is mapped to the paging channel (PCH). The broadcast control channel (BCCH) is mapped to the broadcast channel (BCH) and the downlink shared channel (DL-SCH). The common control channel (CCCH), the dedicated control channel (DCCH), and the dedicated traffic channel (DTCH) are mapped to the downlink shared channel (DL-SCH).

Figure 9:
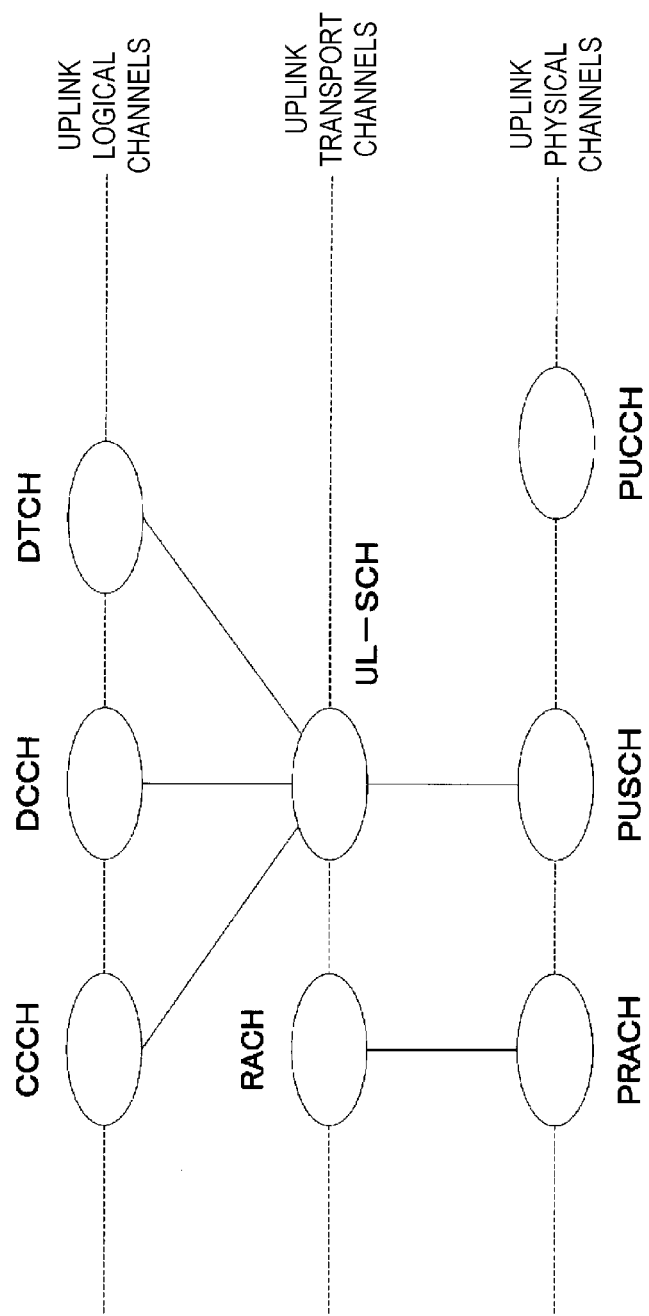
FIG. 9 is a diagram illustrating an uplink channel configuration example in LTE.

FIG. 9 is a diagram illustrating an uplink channel configuration in LTE. Each of uplink channels illustrated in FIG. 9 is consisted of logical channels, transport channels, and physical channels. The respective channels are defined similar to the downlink channels.

The uplink logical channels include a common control channel (CCCH), a dedicated control channel (DCCH), and a dedicated traffic channel (DTCH).

The uplink transport channels include an uplink shared channel (UL-SCH) and a random access channel (RACH).

The uplink physical channels include a physical uplink control channel (PUCCH), a physical uplink shared channel (PUSCH), and a physical random access channel (PRACH). These channels are transmitted and received between a base station device and a mobile station.

Next, the logical channels are described. The common control channel (CCCH), which is a channel used to transmit control information between the mobile station device and the network, is used by a mobile station device not having a radio resource control (RRC) connection with the network.

The dedicated control channel (DCCH), which is a point-to-point bidirectional channel, is used to transmit the individual control information between the mobile station device and the network. The dedicated control channel (DCCH) is used by a mobile station device having a RRC connection. The dedicated traffic channel (DTCH), which is a point-to-point bidirectional channel and is a channel dedicated to single mobile station device, is used to transfer user information (unicast data).

Next, the transport channels are described. The uplink shared channel (UL-SCH) supports a hybrid automatic repeat request (HARQ), dynamic adaptation radio link control, discontinuous transmission (DTX). The random access channel (RACH) is used to transmit limited control information.

Next, the physical channels are described. The physical uplink control channel (PUCCH) is a channel used to notify the base station device of response information (ACK (acknowledge)/NACK (negative acknowledge)) for the downlink data, downlink radio quality information, and an uplink data transmission request (scheduling request: SR). The physical uplink shared channel (PUSCH) is a channel used to transmit the uplink data. The physical random access channel (PRACH) is mainly used for random access preamble transmission for acquiring transmission timing information (transmission timing command) from the mobile station device to the base station device. The random access preamble transmission is performed in the random access procedure.

Next, channel mapping is described. As illustrated in FIG. 9, in the uplink, the transport channels are mapped to the physical channels as below. The uplink shared channel (UL-SCH) is mapped to the physical uplink shared channel (PUSCH). The random access channel (RACH) is mapped to the physical random access channel (PRACH). The physical uplink control channel (PUCCH) is used as the dedicated physical channels.

In the uplink, the logical channels are mapped to the transport channels as below. The common control channel (CCCH), the dedicated control channel (DCCH), and the dedicated traffic channel (DTCH) are mapped to the uplink shared channel (UL-SCH).

Figure 10:
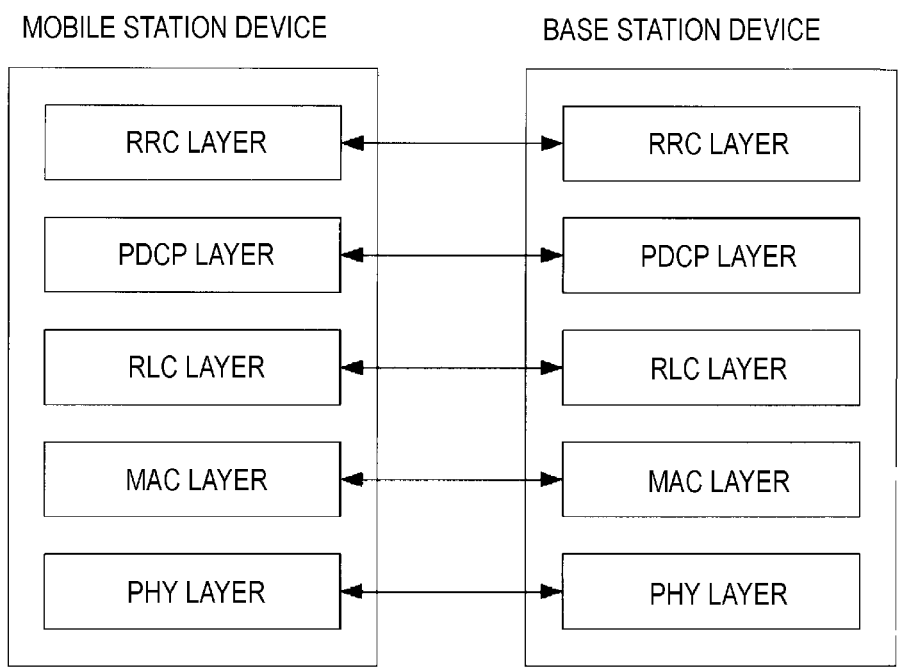
FIG. 10 is a diagram illustrating a configuration example of a communication protocol concerning control information on a base station device and a mobile station device.
Figure 11:
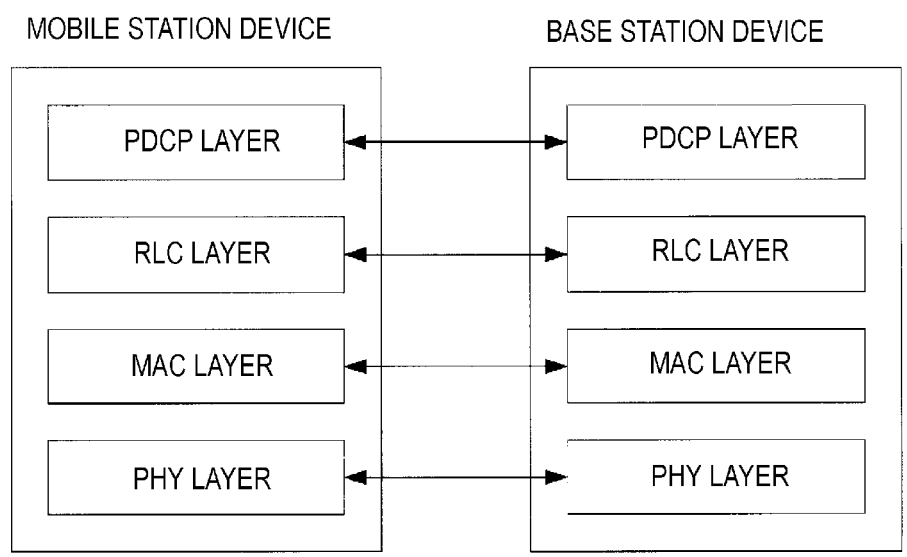
FIG. 11 is a diagram illustrating a configuration example of a communication protocol concerning user information on a base station device and a mobile station device.

FIG. 10 illustrates a protocol stack for dealing with control data for the mobile station device and base station device in LTE. FIG. 11 illustrates a protocol stack for dealing with user data for the mobile station device and base station device in LTE. FIG. 10 and FIG. 11 are described below.

The physical layer (PHY layer) uses the physical channels to provide a transmission service to a higher layer. The PHY layer is connected with the higher medium access control (MAC) layer via the transport channels. The data is moved via the transport channels between layers, the MAC layer and the PHY layer. The data is transmitted and received via the physical channels between the PHY layers of the mobile station device and the base station device. An entity playing a role in each layer may be provided in plural in each layer.

The MAC layer maps various logical channels to the various transport channels. The MAC layer is connected with a higher radio link control layer (RLC layer) via the logical channels. The logical channels are roughly classified depending on a kind of the transmitted information, specifically, classified into the control channels transmitting the control information and the traffic channels transmitting the user information. The MAC layer has a function to control the PHY layer in order to perform the discontinuous reception and transmission (DRX/DTX), a function to notify transmit power information, and a function to perform the HARQ control.

The MAC layer has a function to notify of a data volume in a transmission buffer corresponding to each of the logical channels (buffer status report (BSR)), and a function to request for a radio resource for transmitting the uplink data (scheduling request). The MAC layer performs the random access procedure in a case of an initial access or the scheduling request.

The RLC layer performs segmentation or concatenation of the data received from the higher layer to adjust its data size so that a lower layer can appropriately transmit the data. The RLC layer also has a function to guarantee QoS (quality of service) required for each data. In other words, the RLC layer has a function of data re-transmission control or the like.

A packet data convergence protocol layer (PDCP layer) has a header compression function to compress unnecessary control information in order to efficiently transmit an IP packet, which is the user data, in a radio segment. The PDCP layer also has a data encryption function.

In a radio resource control layer (RRC layer), only the control information is defined. The RRC layer performs configuration and reconfiguration of radio bearers (RBs) to control the logical channels, the transport channels and the physical channels. The RBs are classified into a signaling radio bearer (SRB) and a data radio bearer (DRB), and the SRB is used as a path for transmitting an RRC message that is the control information. The DRB is used as a path for transmitting the user information. The RBs are configured between the RRC layers of the base station device and mobile station device.

The PHY layer corresponds to a physical layer as the first layer in the layered structure of the generally known open systems interconnection (OSI) model. The MAC layer, the RLC layer, and the PDCP layer correspond to a data link layer as the second layer in the OSI model. The RRC layer corresponds to a network layer as the third layer in the OSI model.

The random access procedures are described. The random access procedures include two access procedures of a contention based random access procedure and a non-contention based random access procedure (NPL 1).

Figure 12:
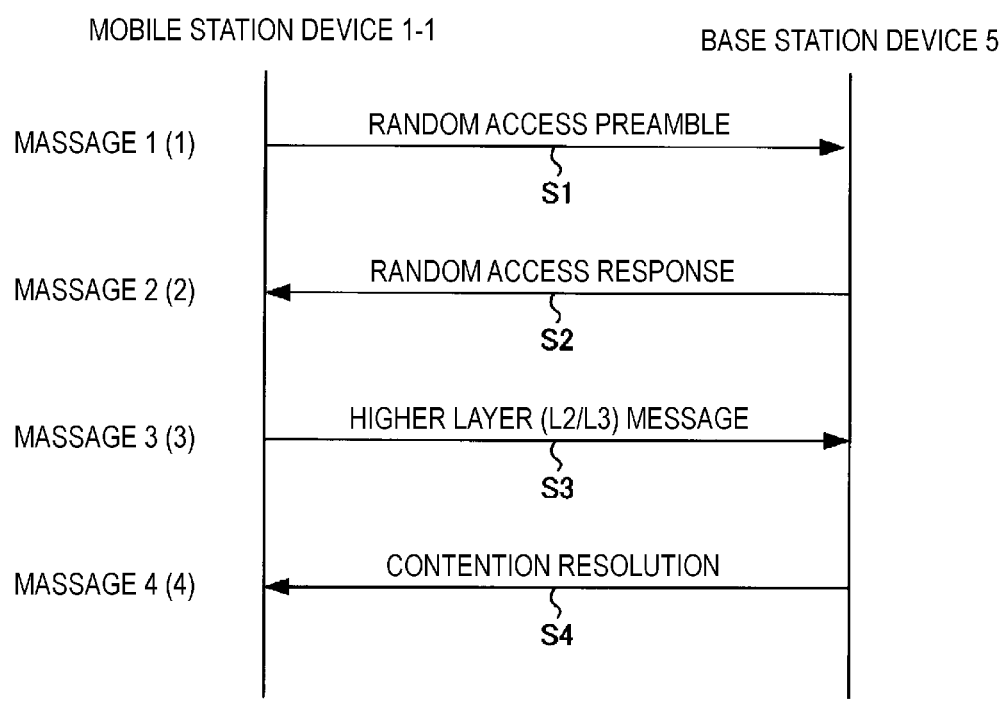
FIG. 12 is a diagram illustrating a contention based random access procedure.

FIG. 12 is a diagram illustrating a contention based random access procedure. The contention based random access procedure is a random access where contention (collision) possibly occurs between the mobile station devices, and is used at an initial access from a state of not connecting (communicating) with the base station device, or for a scheduling request in a case that the uplink data transmission occurs in the mobile station device in a state out of uplink synchronization even during connecting with the base station device.

Figure 13:
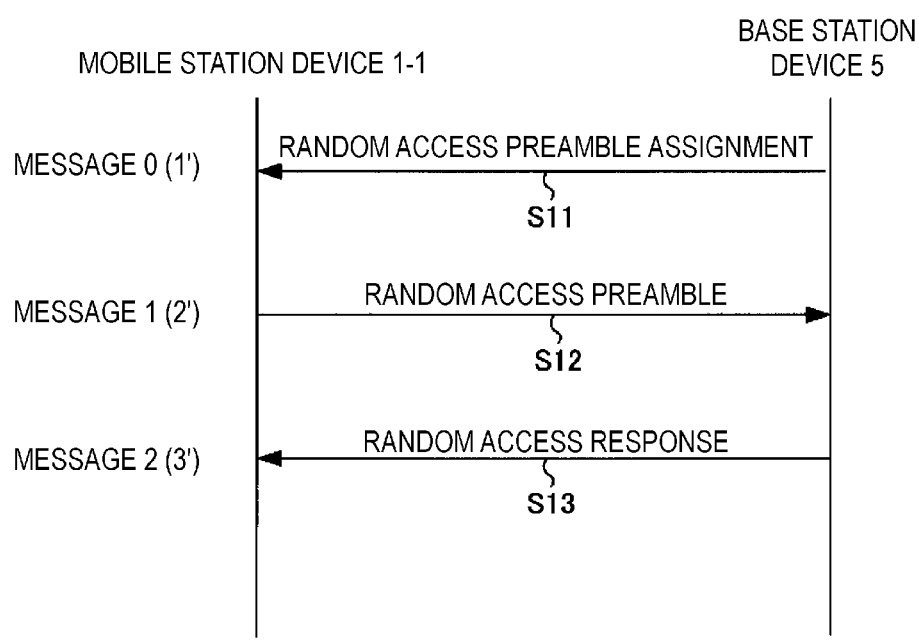
FIG. 13 is a diagram illustrating a non-contention based random access procedure.

FIG. 13 is a diagram illustrating a non-contention based random access procedure. The non-contention based random access procedure is a random access where contention does not occur between the mobile station devices, and the mobile station device is instructed by the base station device to start a random access in a special case, such as a case in which handover or the transmission timing of the mobile station device is not valid for obtaining the uplink synchronization between the mobile station device and the base station device when the base station device and the mobile station device are out of the uplink synchronization even though the base station device and the mobile station device are connected to each other (NPL 1). The non-contention based random access procedure is instructed through a message of the radio resource control (RRC) layer (layer 3) and the control data of the physical downlink control channel (PDCCH). The non-contention based random access procedure being instructed through the control data of the physical downlink control channel (PDCCH) is also referred to as a PDCCH order (random access instruction).

The contention based random access procedure is briefly described with reference to FIG. 12. First, a mobile station device 1-1 transmits a random access preamble to a base station device 5 (message 1: (1), step S1). The base station device 5 receiving the random access preamble transmits a response (random access response message) with respect to the random access preamble to the mobile station device 1-1 (message 2: (2), step S2). The mobile station device 1-1 transmits the message of the higher layer (layer 2/layer 3) on the basis of an uplink grant included in the random access response message (message 3: (3), step S3).

The base station device 5 transmits a contention resolution message to the mobile station device 1-1 having received the higher layer messages at (3) (message 4: (4), step S4). The contention based random access is also referred to as random preamble transmission.

The non-contention based random access procedure is briefly described with reference to FIG. 13. First, the base station device 5 notifies the mobile station device 1-1 of a preamble ID (or a sequence number) and of a random access channel number to be used (message 0: (1'), step S11). The mobile station device 1-1 transmits a random access preamble of the specified preamble ID to the specified random access channel (RACH) (message 1: (2'), step S12). The base station device 5 receiving the random access preamble transmits a response (random access response message) with respect to the random access preamble to the mobile station device 1-1 (message 2: (3'), step S13). However, if a value of the notified preamble ID is zero, the contention based random access procedure is performed. The non-contention based random access is also referred to as dedicated preamble transmission.

A procedure of connecting the mobile station device 1-1 to the base station device 5 is described with reference to FIG. 12. First, the mobile station device 1-1 acquires system information of the base station device 5 from the physical broadcast channel (PBCH) or the like, and performs the random access procedure based on random access-related information included in the system information to connect to the base station device 5. The mobile station device 1-1 generates the random access preamble from the random access-related information or the like in the system information. The mobile station device 1-1 transmits the random access preamble on the random access channel (RACH) (message 1: (1)).

Once the base station device 5 detects the random access preamble from the mobile station device 1-1, the base station device 5 calculates a transmission timing shift amount between the mobile station device 1-1 and the base station device 5 from the random access preamble, performs scheduling (specifies an uplink radio resource location (a location of the physical uplink shared channel (PUSCH)), a transmission format (message size), or the like) in order to transmit the layer 2 (L2)/layer 3 (L3) message, assigns a cell-radio network temporary identity (temporary C-RNTI: mobile station device identification information), allocates, to the physical downlink control channel (PDCCH), a random access-radio network temporary identity (RA-RNTI: random access response identification information) indicating a response (random access response message) directed to the mobile station device 1-1 having transmitted the random access preamble of the random access channel (RACH), and transmits, to the physical downlink shared channel (PDSCH), the random access response message including the transmission timing information, the uplink grant, the temporary C-RNTI, and information of the received random access preamble (message 2: (2)).

Once the mobile station device 1-1 detects the RA-RNTI in the physical downlink control channel (PDCCH), the mobile station device 1-1 checks content of the random access response message on the physical downlink shared channel (PDSCH), and if the transmitted information of the random access preamble is included in the random access response message, the mobile station device 1-1 adjusts uplink transmission timing based on the transmission timing information, and transmits the L2/L3 message including the information identifying the mobile station device 1-1 such as the C-RNTI (or the temporary C-RNTI) or international mobile subscriber identity (IMSI) in the scheduled radio resource and the transmission format (message 3: (3)).

In a case that the mobile station device 1-1 adjusts the transmission timing, the mobile station device 1-1 starts a transmission timing timer. While the transmission timing timer is operating (or running), the transmission timing is valid, and in a case that the transmission timing timer expires or stops, the transmission timing is invalid. While the transmission timing is valid, the mobile station device 1-1 is able to perform data transmission to the base station device 5, and if the transmission timing is invalid, the mobile station device 1-1 is able to transmit only the random access preamble. A time period while the transmission timing is valid is also referred to as an uplink synchronous state, and a time period while the transmission timing is not valid is also referred to as an uplink asynchronous state.

Once the base station device 5 receives the L2/L3 message from the mobile station device 1-1, the base station device 5 uses the C-RNTI (or the temporary C-RNTI) or IMSI included in the received L2/L3 message to transmit, to the mobile station device 1-1, a contention resolution message for determining whether or not a contention (collision) occurs between the mobile station devices 1-1 to 1-3 (message 4: (4)).

Once the mobile station device 1-1 transmits the L2/L3 message, the mobile station device 1-1 starts a contention resolution timer. In a case that the mobile station device 1-1 receives the contention resolution message while the contention resolution timer operates, the mobile station device 1-1 terminates the random access procedure.

In a case that the mobile station device 1-1 does not detect, during a random access response window, the random access response message including the preamble ID corresponding to the transmitted random access preamble, or fails to transmit the message 3, or does not detect the identification information of the mobile station device 1-1 itself in the contention resolution message until the contention resolution timer expires, the mobile station device 1-1 starts again from the transmission of the random access preamble (message 1: (1)).

Then, if the number of transmissions of the random access preamble exceeds the maximum number of transmissions of the random access preamble indicated by the system information, the mobile station device 1-1 determines a radio link failure and performs connection re-establishment processing. After a success in the random access procedure, the control data for connection is further communicated between the base station device 5 and the mobile station device 1-1. At this time, the base station device 5 notifies the mobile station device 1-1 of the uplink reference signal to be individually assigned, and allocation information of the physical uplink control channel (PUCCH).

The uplink transmission timing after the random access procedure completion is updated by the base station device 5 measuring the uplink reference signal (sounding reference signal or demodulation reference signal) transmitted from the mobile station device 1-1 to calculate the transmission timing, and notifying the mobile station device 1-1 of the transmission timing message including the calculated transmission timing information.

When the mobile station device 1-1 updates the transmission timing indicated in the transmission timing message notified by the base station device 5, the mobile station device 1-1 restarts the transmission timing timer. The base station device 5 also holds a transmission timing timer the same as the timer in the mobile station device 1-1, and if the base station device 5 transmits the transmission timing information, the base station device 5 starts or restarts the transmission timing timer. In this way, the base station device 5 and the mobile station device 1-1 manage the uplink synchronous state. If the transmission timing timer expires, or if the transmission timing timer does not operate, the transmission timing is invalid.

In 3GPP, further evolved LTE, LTE-Advanced has been discussed. In LTE-Advanced, it is assumed that a band having the maximum bandwidth of 100 MHz is used in each of the uplink and the downlink to perform communication at a transmission rate of 1 Gbps or greater in the downlink and 500 Mbps or greater in the uplink at a maximum.

In LTE-Advanced, it has been considered that multiple bands of 20 MHz or less in LTE are aggregated such that the mobile station device of LTE can be also accommodated to attain the maximum band of 100 MHz. In LTE-Advanced, one band of 20 MHz or less in LTE is referred to as a component carrier (CC) (NPL 1).

One downlink component carrier and one uplink component carrier are combined to configure one cell. Even only one downlink component carrier can configure one cell. Multiple cells being aggregated so that the base station device and the mobile station device communicate with each other via the multiple cells is referred to as carrier aggregation.

One base station device assigns multiple cells suitable for a communication capability or communication condition of the mobile station device to communicate with the mobile station device via the assigned multiple cells. The multiple cells assigned to the mobile station device are classified into one primary cell (PCell) and secondary cells (SCells) other than the primary cell. A special function, such as physical uplink control channel (PUCCH) allocation, is configured in the primary cell.

On the other hand, in LTE-Advanced, cost reduction has been studied for the mobile station device for a special category such as a mobile station device supporting machine type communication (MTC) or machine to machine communication (M2M) (NPL 2). Hereinafter, the MTC/M2M mobile station device or the MTC/M2M communication device is also referred to as a machine type communication user equipment (MTCUE).

In order to attain a low-cost MTCUE complying with the LTE standard and the LTE-Advanced standard, there has been proposed a cost reduction method including narrowing a transmission and reception bandwidth, reduction in the number of antenna ports/the number of RF chains, reduction in a transmitted and received data transfer rate, employment of a half-duplex frequency division duplex mode, reduction in transmit and receive power, and extension of a discontinuous reception interval. There has been suggested that reduction of maximum bandwidth is effective in a transmission and reception RF circuit and transmission and reception baseband circuit of the MTCUE as a method in order to attain a low-cost MTCUE.

In order to compensate degradation of reception and transmission characteristics due to the reduction in the number of antenna ports or the like, it has been considered that the downlink data or the downlink signal is repeatedly transmitted to the MTCUE for a single data transmission, and the MTCUE repeatedly transmits the uplink data or the uplink signal to the base station device for a single data transmission.

In the study on the MTC, coverage enhancement has been studied for enhancing a transmission and reception coverage of the MTCUE, in addition to the study for the cost reduction. In order to reduce the transmit and receive power and enhance the coverage, it has been considered that the base station device repeatedly transmits the downlink data or the downlink signal to the MTCUE for a single data transmission, and the MTCUE repeatedly transmits the uplink data or the uplink signal to the base station device for a single data transmission.

The MTCUE repeatedly receives the data from the base station device for a single data reception, and adds up the repeatedly received data to demodulate the data. The base station device also repeatedly receives the data from the MTCUE, and adds up the repeatedly received data to demodulate the data.

For example, the base station device repeatedly transmits the physical broadcast channel (PBCH) to the MTCUE multiple times within 40 ms. The base station device repeatedly transmits the physical downlink shared channel (PDSCH), the physical downlink control channel (PDCCH), and an enhanced physical downlink control channel (EPDCCH) to the MTCUE multiple times. The MTCUE transmits the physical uplink shared channel (PUSCH), the physical uplink control channel (PUCCH), and the like to the base station device multiple times.

In the random access procedure, the MTCUE repeatedly transmits the same random access preamble on multiple physical random access channels (PRACHs). The base station device receiving the random access preamble repeatedly transmits a random access response message. The message 3 and the contention resolution are also repeatedly transmitted. The base station device notifies the MTCUEs in the cell on the broadcast channel (BCH) or individually notifies the MTCUE of the number of repetitive transmissions and receptions (NPL 3).

For example, the number of repetitions of the random access preamble transmission is notified on the broadcast channel (BCH). It has been also studied that the number of repetitions of the random access preamble transmission includes multiple kinds of the numbers of repetitive transmissions such that the MTCUE can select one number of repetitive transmissions from the multiple kinds of the numbers of repetitive transmissions. A single repetitive transmission is also referred to as a single attempt.

Control of repetition with respect to the physical downlink control channel (PDCCH) reception, the enhanced physical downlink control channel (EPDCCH) reception, the physical uplink control channel (PUCCH) transmission, and the physical random access channel (PRACH) (or random access preamble) transmission is also referred to as repetition or repetition control, and control of repetition with respect to the physical downlink shared channel (PDSCH) reception and the physical uplink shared channel (PUSCH) transmission is also referred to as bundling or bundling control.

When the bundling is configured, a bundle size defines the number of subframes in one bundle. A bundling operation relies on a HARQ entity invoking an identical HARQ process for the respective transmissions constituting the identical bundle. HARQ retransmission is non-adaptive in one bundle, and is triggered depending on the bundle size without waiting for a feedback from the last transmission. The HARQ feedback for one bundle is received (HARQ-ACK for PUSCH) or transmitted (HARQ-ACK for PDSCH) received by the terminal device with respect to only the last subframe in the bundle. The bundling processing is performed in the MAC layer.

The mobile station device designed for the machine type communication (MTC) or machine to machine communication (M2M) and supporting the cost reduction and/or coverage enhancement, or the MTC/M2M communication device is described below as a machine type communication user equipment (MTCUE). However, an application of such a mobile station device is not limited to the machine type communication or the machine to machine communication. A mobile station device not characterized by the cost reduction nor the coverage enhancement is described below merely as a mobile station device.

EMBODIMENT

Description of Configuration

Figure 1:
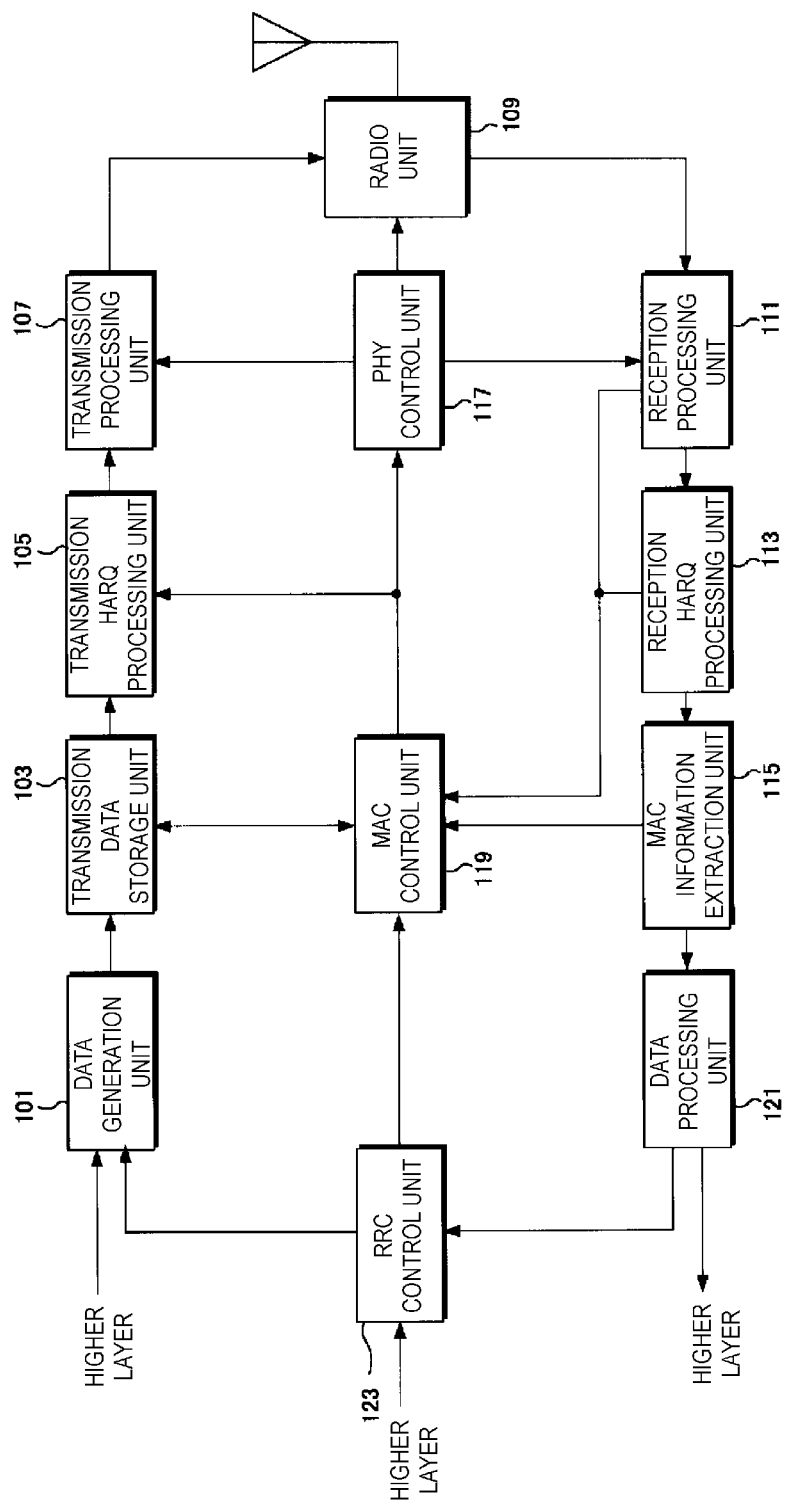
FIG. 1 is a diagram illustrating an example of a configuration of an MTCUE according to an embodiment of the present invention.

FIG. 1 is a diagram illustrating a configuration of an MTCUE according to an embodiment of the present invention. MTCUEs 3-1 to 3-3 each include a data generation unit 101, a transmission data storage unit 103, a transmission HARQ processing unit 105, a transmission processing unit 107, a radio unit 109, a reception processing unit 111, a reception HARQ processing unit 113, a MAC information extraction unit 115, a PHY control unit 117, a MAC control unit 119, a data processing unit 121, and an RRC control unit 123.

User data from a higher layer and control data from the RRC control unit 123 are input to the data generation unit 101. The data generation unit 101 has functions of the PDCP layer and RLC layer. The data generation unit 101 performs processing of header compression, data encryption, data segmentation and concatenation of the IP packet of the user data or the like to adjust a data size. The data generation unit 101 outputs the processed data to the transmission data storage unit 103.

The transmission data storage unit 103 accumulates the data input from the data generation unit 101, and outputs the data specified on the basis of an instruction from the MAC control unit 119, by a specified data volume, to the transmission HARQ processing unit 105. The transmission data storage unit 103 outputs information on the data volume of the accumulated data to the MAC control unit 119.

The transmission HARQ processing unit 105 encodes the input data, and performs a puncture process on the encoded data. The transmission HARQ processing unit 105 outputs the punctured data to the transmission processing unit 107, and stores the encoded data. If the transmission HARQ processing unit 105 is instructed by the MAC control unit 119 to retransmit the data, the transmission HARQ processing unit 105 performs, on the stored (buffered) encoded data, a puncture process different from the puncture performed last time, and outputs the punctured data to the transmission processing unit 107. If the transmission HARQ processing unit 105 is instructed by the MAC control unit 119 to delete the data, the transmission HARQ processing unit 105 deletes the data corresponding to the specified cell.

The transmission processing unit 107 modulates and encodes the data input from the transmission HARQ processing unit 105. The transmission processing unit 107 performs discrete Fourier transform (DFT)-inverse fast Fourier transform (IFFT) processing on the modulated and encoded data, and, after this processing, inserts a cyclic prefix (CP), allocates the data after the CP insertion on the physical uplink shared channel (PUSCH) in each uplink component carrier (cell), and outputs to the radio unit 109.

If the transmission processing unit 107 is instructed by the PHY control unit 117 to response to the reception data, the transmission processing unit 107 generates an ACK or NACK signal, allocates the generated signal on the physical uplink control channel (PUCCH), and outputs to the radio unit 109. If the transmission processing unit 107 is instructed by the PHY control unit 117 to transmit the random access preamble, the transmission processing unit 107 generates the random access preamble, allocates the generated signal on the physical random access channel (PRACH), and outputs to the radio unit 109. The transmission processing unit 107 performs the repetitive transmission processing on the basis of the instruction from the PHY control 117.

The radio unit 109 up-converts the date input from the transmission processing unit 107 into data of a radio frequency according to transmission location information (transmission cell information) specified by the PHY control unit 117, adjusts transmit power, and transmits the data from a transmission antenna. The radio unit 109 down-converts a radio signal received through a reception antenna to output to the reception processing unit 111. The radio unit 109 configures the transmission timing information received from the PHY control unit 117 as the uplink transmission timing.

The reception processing unit 111 performs fast Fourier transform (FFT) processing, decoding, demodulation processing, and the like on the signal input from the radio unit 109. If the reception processing unit 111 demodulates the physical downlink control channel (PDCCH) or the enhanced physical downlink control channel (EPDCCH) to detect downlink assignment information for the device itself, the reception processing unit 111 demodulates the physical downlink shared channel (PDSCH) on the basis of the downlink assignment information, and outputs acquisition of the downlink assignment information to the MAC control unit 119.

The reception processing unit 111 outputs the data of the demodulated physical downlink shared channel (PDSCH) to the reception HARQ processing unit 113. If the reception processing unit 111 demodulates the physical downlink control channel (PDCCH) or the enhanced physical downlink control channel (EPDCCH) to detect the uplink grant and the response information (ACK/NACK) to the uplink transmission data, the reception processing unit 111 outputs the acquired response information to the MAC control unit 119. The uplink grant includes a data modulating and encoding scheme, the data size information, the HARQ information, the transmission location information and the like. The reception processing unit 111 performs the repetitive reception processing on the basis of the instruction from the PHY control 117.

The reception HARQ processing unit 113 performs decode processing on the data input from the reception processing unit 111, and in a case of succeeding in the decode processing, outputs the data to the MAC information extraction unit 115. If the reception HARQ processing unit 113 fails in the decode processing on the input data, the reception HARQ processing unit 113 stores the data on which the decode processing has failed. If the reception HARQ processing unit 113 receives retransmitted data, the reception HARQ processing unit 113 synthesizes the stored data and the retransmitted data to perform the decode processing. The reception HARQ processing unit 113 notifies the MAC control unit 119 of a success or failure of the decode processing on the input data.

The MAC information extraction unit 115 extracts control information of a medium access control layer (MAC layer) from the data input from the reception HARQ processing unit 113, and outputs the extracted MAC control information (MAC control element) to the MAC control unit 119. The MAC information extraction unit 115 outputs the rest of the data to the data processing unit 121. The data processing unit 121, which has functions of the PDCP layer and RLC layer, performs a function to decompress (restore) a compressed IP header or a function to decode the encrypted data, and processing of data segmentation and concatenation or the like to reconstruct an original form of the data. The data processing unit 121 divides the data into the RRC message and the user data, and outputs the RRC message and the user data to the RRC control unit 123 and the higher layer, respectively.

The PHY control unit 117 controls the transmission processing unit 107, the radio unit 109, and the reception processing unit 111 according to an instruction from the MAC control unit 119. The PHY control unit 117 is notified by the MAC control unit 119 of the modulating and encoding scheme and the transmit power information, and notifies the transmission processing unit 107 and the radio unit 109 of the modulating and encoding scheme and the transmit power information, respectively.

If the PHY control unit 117 is notified by the MAC control unit 119 of a PDSCH/PUSCH repetition level or the number of repetitions, the PHY control unit 117 controls the transmission processing unit 107 and the reception processing unit 111 to perform the repetitive transmissions or the repetitive receptions by the number of repetitions based on the notified PDSCH/PUSCH repetition level.

If the PHY control unit 117 is notified by the MAC control unit 119 of a PRACH repetition level or the number of repetitions, the PHY control unit 117 controls the transmission processing unit 107 and the reception processing unit 111 to perform the repetitive transmissions of the random access preamble or the repetitive receptions of the random access response by the number of repetitions based on the notified PRACH repetition level.

The MAC control unit 119, which has a function of the MAC layer, controls the MAC layer on the basis of information acquired from the RRC control unit 123, the lower layer, or the like. The MAC control unit 119 determines a data transmission priority order based on a data transmission control configuration specified by the RRC control unit 123, data volume information acquired from the transmission data storage unit 103, and the uplink grant acquired from the reception processing unit 111, and notifies the transmission data storage unit 103 of information relating to the data to transmit. The MAC control unit 119 notifies the transmission HARQ processing unit 105 of the HARQ information, and outputs the modulating and encoding scheme to the PHY control unit 117.

The MAC control unit 119 acquires the response information for the uplink transmission data from the reception processing unit 111, and if the response information indicates the NACK (negative response), the MAC control unit 119 instructs the transmission HARQ processing unit 105 and the PHY control unit 117 to retransmit the data. If the MAC control unit 119 acquires information concerning the success/failure of the decode processing on the data from the reception HARQ processing unit 113, the MAC control unit 119 instructs the PHY control unit 117 to transmit the ACK or NACK signal.

The MAC control unit 119 performs the random access procedure. The MAC control unit 119 performs processing such as selecting the random access preamble, receiving the random access response message, and managing the contention resolution timer. The MAC control unit 119 notifies the PHY control unit 117 of information required for the random access preamble transmission, random access response message reception, message 3 transmission, and contention resolution reception.

The MAC control unit 119 acquires transmission timing timer information from the RRC control unit 123. The MAC control unit 119 uses the transmission timing timer to manage validity or invalidity of the uplink transmission timing. The MAC control unit 119 outputs to the PHY control unit 117 the transmission timing information (transmission timing command) included in the transmission timing message among the MAC control information input from the MAC information extraction unit 115. If the MAC control unit 119 applies the transmission timing, the MAC control unit 119 starts or restarts the transmission timing timer.

In a case of expiration of the transmission timing timer, the MAC control unit 119 instructs the transmission HARQ processing unit 105 to delete the stored data. The MAC control unit 119 notifies the RRC control unit 123 to release the physical uplink control channel (PUCCH) and the radio resource of the uplink sounding reference signal. The MAC control unit 119 discards the uplink grant.

The MAC control unit 119 uses a repetition level timer acquired from the RRC control unit 123 to perform the repetition control. If the MAC control unit 119 acquires information indicating the PDSCH/PUSCH repetition level (PDSCH/PUSCH repetition level command) by way of the MAC control information input from the MAC information extraction unit 115, the MAC control unit 119 notifies the PHY control unit 117 of the PDSCH/PUSCH repetition level and starts or restarts the repetition level timer. Then, if the repetition level timer expires, the MAC control unit 119 configures the PDSCH/PUSCH repetition level to a default value. The MAC control unit 119 may notify the RRC control unit 123 of the expiration of the repetition level timer.

The MAC control unit 119 generates a buffer status report (BSR) that is volume information on data accumulated in the transmission data storage unit 103, and outputs to the transmission data storage unit 103. The MAC control unit 119 generates a power headroom report (PHR) that is the transmit power information, and outputs to the transmission data storage unit 103.

The RRC control unit 123 performs various configurations for communicating with the base station device 5 such as connection establishment or connection release with the base station device 5, and the data transmission control configuration for the control data and user data. The RRC control unit 123 communicates the information with the higher layer in association with the various configurations, and controls the lower layer in association with the various configurations.

The RRC control unit 123 creates an RRC message, and outputs the created RRC message to the data generation unit 101. The RRC control unit 123 analyzes the RRC message input from the data processing unit 121. The RRC control unit 123 creates a message indicating a transmission capability of the MTCUE itself, and outputs to the data generation unit 101. The RRC control unit 123 outputs information required by the MAC layer to the MAC control unit 119, and outputs information required by the physical layer to the PHY control unit 117, If the RRC control unit 123 acquires the system information, the RRC control unit 123 outputs required information for the MAC control unit 119 and the PHY control unit 117. If the RRC control unit 123 is notified by the MAC control unit 119 to release the physical uplink control channel (PUCCH) or the uplink sounding reference signal, the RRC control unit 123 releases the allocated physical uplink control channel (PUCCH) and uplink sounding reference signal, and instructs the PHY control unit 117 to release the physical uplink control channel (PUCCH) and the uplink sounding reference signal.

If the RRC control unit 123 acquires the system information for the MTCUE, the RRC control unit 123 configures a repetition mode (bundling mode, repetitive transmission and reception mode). In the case of the MTCUE, the repetition mode may be configured.

If the RRC control unit 123 acquires the information relating to the PDSCH/PUSCH repetition, the RRC control unit 123 outputs the number of repetitive transmissions and receptions and the repetition level timer information which correspond to the repetition level to the MAC control unit 119 and the PHY control unit 117.

The transmission processing unit 107, the radio unit 109, the reception processing unit 111, and the PHY control unit 117 perform operations of the physical layer. The transmission data storage unit 103, the transmission HARQ processing unit 105, the reception HARQ processing unit 113, the MAC information extraction unit 115, and the MAC control unit 119 perform operations of the MAC layer. The data generation unit 101 and the data processing unit 121 perform operations of the RLC layer and the PDCP layer. The RRC control unit 123 performs operations of the RRC layer.

Figure 2:
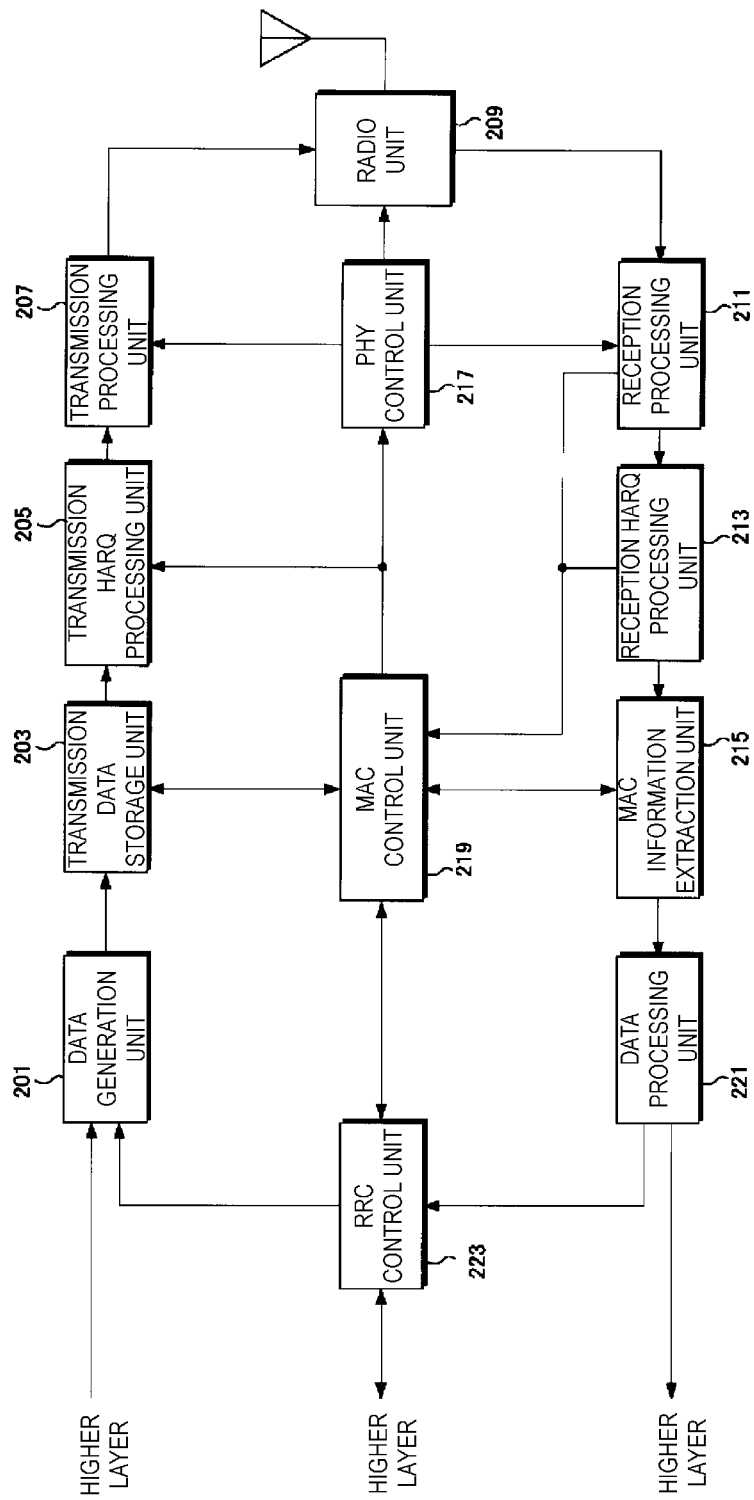
FIG. 2 is a diagram illustrating an example of a configuration of a base station device according to an embodiment of the present invention.

FIG. 2 is a diagram illustrating a configuration of the base station device according to the embodiment of the present invention. The base station device 5 includes a data generation unit 201, a transmission data storage unit 203, a transmission HARQ processing unit 205, a transmission processing unit 207, a radio unit 209, a reception processing unit 211, a reception HARQ processing unit 213, a MAC information extraction unit 215, a PHY control unit 217, a MAC control unit 219, a data processing unit 221, and an RRC control unit 223.

User data from a higher layer and control data from the RRC control unit 223 are input to the data generation unit 201. The data generation unit 201, which has functions of the PDCP layer and RLC layer, performs header compression or data encryption, and processing of data segmentation and concatenation of the IP packet of the user data or the like to adjust a data size. The data generation unit 201 outputs the processed data and logical channel information on the data to the transmission data storage unit 203.

The transmission data storage unit 203 accumulates the data input from the data generation unit 201 for each user, and outputs the data of the user specified on the basis of an instruction from the MAC control unit 219, by a specified data volume, to the transmission HARQ processing unit 205. The transmission data storage unit 203 outputs information on the data volume of the accumulated data to the MAC control unit 219.

The transmission HARQ processing unit 205 encodes the input data, and performs a puncture process on the encoded data. The transmission HARQ processing unit 205 outputs the punctured data to the transmission processing unit 207, and stores the encoded data. If the transmission HARQ processing unit 205 is instructed by the MAC control unit 219 to retransmit the data, the transmission HARQ processing unit 205 performs, on the stored encoded data, a puncture process different from the puncture performed last time, and outputs the punctured data to the transmission processing unit 207.

The transmission processing unit 207 modulates and encodes the data input from the transmission HARQ processing unit 205. The transmission processing unit 207 maps the modulated and encoded data to the signal and channel such as the physical downlink control channel (PDCCH), the downlink synchronization signal, the physical broadcast channel (PBCH), and the physical downlink shared channel (PDSCH), and performs OFDM signal processing such as serial-parallel conversion, inverse fast Fourier transform (IFFT), and CP insertion on the mapped data to generate an OFDM signal.

The transmission processing unit 207 outputs the generated OFDM signal to the radio unit 209. If the transmission processing unit 207 is instructed by the MAC control unit 219 to response to the reception data, the transmission processing unit 207 generates an ACK or NACK signal, allocates the generated signal on the physical downlink control channel (PDCCH), and outputs to the radio unit 209. The transmission processing unit 207 performs the repetitive transmission processing on the basis of the instruction from the PHY control 217.

The radio unit 209 up-converts the date input from the transmission processing unit 207 into data of a radio frequency, adjusts the transmit power, and transmits the data from a transmission antenna. The radio unit 209 down-converts the radio signal received through a reception antenna to output to the reception processing unit 211.

The reception processing unit 211 performs fast Fourier transform (FFT) processing, decoding, demodulation processing, and the like on the signal input from the radio unit 209. The transmission processing unit 211 also performs the repetitive reception processing on the basis of the instruction from the PHY control 217.

The reception processing unit 211 outputs the data of the physical uplink shared channel (PUSCH) among the demodulated data to the reception HARQ processing unit 213. The reception processing unit 211 outputs to the MAC control unit 219 the response information (ACK/NACK) to the downlink transmission data, downlink radio quality information (CQI), and uplink transmission request information (scheduling request) of the control data acquired from the physical uplink control channel (PUCCH) among the demodulate data. The reception processing unit 211 calculates uplink radio quality from the uplink sounding reference signal of the MTCUE 3-1, and outputs the uplink radio quality information to the RRC control unit 223 and the MAC control unit 219.

The reception processing unit 211 performs processing of detecting the random access preamble by the number of repetitions specified by the PHY control unit 217. If the reception processing unit 211 detects the random access preamble, the reception processing unit 211 calculates transmission timing from the detected random access preamble, and outputs a random access preamble ID of the detected random access preamble and the calculated transmission timing to the MAC control unit 219. The reception processing unit 211 calculates a transmission timing from the uplink reference signal, and outputs the calculated transmission timing to the MAC control unit 219.

The reception HARQ processing unit 213 performs decode processing on the data input from the reception processing unit 211, and in a case of succeeding in the decode processing, outputs the data to the MAC information extraction unit 215. If the reception HARQ processing unit 213 fails in the decode processing on the input data, the reception HARQ processing unit 213 stores the data on which the decode processing has failed. If the reception HARQ processing unit 213 receives retransmitted data, it synthesizes the stored data and the retransmitted data to perform the decode processing. The reception HARQ processing unit 213 notifies the MAC control unit 219 of a success or failure of the decode processing on the input data. If the reception HARQ processing unit 213 is instructed by the MAC control unit 219 to delete the data, the reception HARQ processing unit 213 deletes the data corresponding to the specified cell.

The MAC information extraction unit 215 extracts control information of a MAC layer from the data input from the reception HARQ processing unit 213, and outputs the extracted control information to the MAC control unit 219.

The MAC information extraction unit 215 outputs the rest of the data to the data processing unit 221. The data processing unit 221, which has functions of the PDCP layer and RLC layer, performs a function to decompress (restore) a compressed IP header or a function to decode the encrypted data, and processing of data segmentation and concatenation or the like to reconstruct an original form of the data. The data processing unit 221 divides the data into the RRC message and the user data, and outputs the RRC message and the user data to the RRC control unit 223 and the higher layer, respectively.

The PHY control unit 217 controls the transmission processing unit 207, the radio unit 209, and the reception processing unit 211 according to an instruction from the MAC control unit 219. The PHY control unit 217 is notified by the MAC control unit 219 of the modulating and encoding scheme and the transmit power information, and notifies the transmission processing unit 207 and the radio unit 209 of the modulating and encoding scheme and the transmit power information, respectively.

The PHY control unit 217 notifies the reception processing unit 211 of information required for reception processing of the random access preamble from information relating to the random access procedure.

If the PHY control unit 217 is notified by the MAC control unit 219 of a PDSCH/PUSCH repetition level or the number of repetitions, the PHY control unit 217 controls the transmission processing unit 207 and the reception processing unit 211 to perform the repetitive transmissions or the repetitive receptions by the number of repetitions based on the notified repetition level.

The MAC control unit 219, which has a function of the MAC layer, controls the MAC layer on the basis of information acquired from the RRC control unit 223, the lower layer, or the like. The MAC control unit 219 performs downlink and uplink scheduling processing.

The MAC control unit 219 performs the downlink and uplink scheduling processing on the basis of the response information (ACK/NACK) to the downlink transmission data, the downlink radio quality information (CQI), the uplink radio quality information, and the uplink transmission request information (scheduling request) which are input from the reception processing unit 211, the control information which is input from the MAC information extraction unit 215, and the data volume information for each user, the number of repetitive transmissions and receptions, and a reception operation state of the MTCUE 3-1 which are acquired from the transmission data storage unit 203. The MAC control unit 219 outputs a scheduling result to the transmission processing unit 207. The MAC control unit 219 determines the reception operation state of the MTCUE 3-1 on the basis of a discontinuous reception parameter acquired from the RRC control unit 223.

The MAC control unit 219 acquires the response information for the uplink transmission data from the reception processing unit 211, and if the response information indicates the NACK (negative response), the MAC control unit 219 instructs the transmission HARQ processing unit 205 and the transmission processing unit 207 to retransmit the data. If the MAC control unit 219 acquires the information concerning the success/failure of the decode processing on the data from the reception HARQ processing unit 213, the MAC control unit 219 instructs the transmission processing unit 207 to transmit the ACK or NACK signal.

If the MAC control unit 219 acquires the random access preamble ID and the transmission timing from the reception processing unit 211, the MAC control unit 219 creates a random access response message and outputs the random access response message to the transmission data storage unit 203. The random access response message may include the PDSCH/PUSCH repetition level command. If the MAC control unit 219 acquires the transmission timing from the reception processing unit 211, the MAC control unit 219 creates a transmission timing message including the transmission timing and outputs the transmission timing message to the transmission data storage unit 203.

The MAC control unit 219 determines the MTCUE or the mobile station device on the basis of the random access preamble ID notified by the reception processing unit 211. It is determined whether the repetitive transmission or the repetitive reception is required for transmission of the random access response message, transmission of the contention resolution, and reception of the message 3 to schedule the random access response message transmission, the contention resolution transmission, and the message 3 reception.

The MAC control unit 219 manages the uplink transmission timing. The MAC control unit 219 uses the transmission timing timer to manage the uplink transmission timing for the MTCUE 3-1. If the MAC control unit 219 transmits the transmission timing message to the MTCUE 3-1, the MAC control unit 219 starts or restarts the transmission timing timer.

The MAC control unit 219 instructs the reception HARQ processing unit 213 to cause the MTCUE 3-1 to delete the data stored in the MTCUE 3-1. The MAC control unit 219 notifies the RRC control unit 223 to release the physical uplink control channel (PUCCH) and radio resource of the uplink sounding reference signal allocated to the MTCUE 3-1. The MAC control unit 219 stops scheduling the uplink data for the MTCUE 3-1.

The MAC control unit 219 uses a repetition level timer acquired from the RRC control unit 223 to control the repetitive transmission and reception.

The MAC control unit 219 determines the PDSCH/PUSCH repetition level on the basis of the uplink radio quality information from the reception processing unit 211 or the downlink radio quality information notified by the MTCUE 3-1 (e.g., CQI, RSRP, RSRQ), for example, creates the MAC control information including information indicating the PDSCH/PUSCH repetition level or PDSCH/PUSCH bundling size (hereinafter, referred to as PDSCH/PUSCH repetition level command), and outputs the MAC control information including the PDSCH/PUSCH repetition level command to the transmission data storage unit 203.

The MAC control unit 219 starts or restarts the repetition level timer in a case that the PDSCH/PUSCH repetition level command is transmitted, or the MTCUE 3-1 receives the PDSCH/PUSCH repetition level command, or the positive response (ACK) in response to the PDSCH/PUSCH repetition level command is received from the MTCUE 3-1. In the case that the PDSCH/PUSCH repetition level command is transmitted, the MAC control unit 219 notifies the PHY control unit 219 of a new PDSCH/PUSCH repetition level.

The MAC control unit 219 may create the MAC control information instructing to start or restart the repetition level timer and notify the MTCUE 3-1 of the information. In a case of expiration of the repetition level timer, the MAC control unit 219 may notify the RRC control unit 223 of the expiration of the repetition level timer. The PDSCH/PUSCH repetition level may be managed by the RRC control unit 223.

The RRC control unit 223 performs various configurations for communicating with the MTCUE 3-1 such as processing of connection establishment or connection release with the MTCUE 3-1, and data transmission control configuration for the control data and user data of the MTCUE 3-1, communicates the information with the higher layer in association with the various configurations, and controls the lower layer in association with the various configurations.

The RRC control unit 223 creates the various RRC messages, and outputs the created RRC messages to the data generation unit 201. The RRC control unit 223 analyzes the RRC message input from the data processing unit 221.

The RRC control unit 223 creates a message including the system information. The RRC control unit 223 may create a message including the system information for the MTCUE 3-1 separately from a message including the system information for the mobile station device 1-1.

The RRC control unit 223 notifies the PHY control unit 217 and the MAC control unit 219 of the information relating to the random access procedure included in the system information.

The RRC control unit 223 creates a message including the information relating to the PDSCH/PUSCH repetition level, and outputs to the transmission data storage unit 203. The information relating to the PDSCH/PUSCH repetition level may include information relating to a maximum repetition level, the number of repetitions corresponding to the PDSCH/PUSCH repetition level, and a value of the repetition level timer. The information relating to the PDSCH/PUSCH repetition level may be configured in the system information.

If the message including the information relating to the PDSCH/PUSCH repetition level is transmitted, the RRC control unit 223 notifies the MAC control unit 219 of the information relating to the maximum PDSCH/PUSCH repetition level, the number of repetitions corresponding to the PDSCH/PUSCH repetition level, and the value of the repetition level timer. If the message including the information relating to the PDSCH/PUSCH repetition level is transmitted, the RRC control unit 223 notifies the PHY control unit 217 of the number of repetitions corresponding to the PDSCH/PUSCH repetition level.

The RRC control unit 223 outputs required information for the MAC layer to the MAC control unit 219, and outputs required information for the physical layer to the PHY control unit 217. If the RRC control unit 223 is notified by the MAC control unit 219 to release the physical uplink control channel (PUCCH) or the uplink sounding reference signal, the RRC control unit 223 releases the allocated physical uplink control channel (PUCCH) and uplink sounding reference signal, and instructs the PHY control unit 217 to release the physical uplink control channel (PUCCH) and the uplink sounding reference signal.

The transmission processing unit 207, the radio unit 209, and the reception processing unit 211 perform operations of the PHY layer. The transmission data storage unit 203, the transmission HARQ processing unit 205, the reception HARQ processing unit 213, the MAC information extraction unit 215, and the MAC control unit 219 perform operations of the MAC layer. The data generation unit 201 and the data processing unit 221 perform operations of the RLC layer and the PDCP layer. The RRC control unit 223 performs operations of the RRC layer.

Description of Operations

Assume a radio communication system as described in FIG. 7 to FIG. 13. As illustrated in FIG. 7, the base station device 5 communicates with the MTCUEs 3-1, 3-2, and 3-3 or the mobile station devices 1-1, 1-2, and 1-3.

Operations of the MTCUE 3-1 and the base station device 5 are described. The MTCUE 3-1 performs a cell search to find one cell of the base station device 5. The MTCUE 3-1 receives the physical broadcast channel (PBCH) of the cell or the like to acquire the system information (the physical channel configuration, transmit power information, information relating to the random access procedure, transmission timing timer information or the like of the cell).

The base station device 5 may separate the system information into system information broadcasted to the MTCUE 3-1 and system information broadcasted to the mobile station device 1-1. The base station device 5 may configure contents of the system information broadcasted to the MTCUE 3-1 different from contents of the system information broadcasted to the mobile station device 1-1. For example, the base station device 5 broadcasts a system information block type 1 of the system information of related art to the mobile station device 1-1. The base station device 5 may broadcast a system information block type 1A of new system information to the MTCUE 3-1.

Information relating to the random access procedure for the MTCUE 3-1 includes random access channel configuration information including physical random access channel (PRACH) allocation information and random access preamble generation information, and random access common configuration information including random access preamble selection information, information relating to the PRACH repetition level, transmit power information of the random access preamble, information relating to the maximum number of transmissions of the random access preamble, information relating to the random access response message reception, information relating to the message 3 transmission, and information relating to the contention resolution message reception.

The information relating to the PRACH repetition level may include information relating to the number of repetitions of the random access preamble for each PRACH repetition level. The information relating to the PRACH repetition level may include information indicating a maximum PRACH repetition level (RepetitionLevelMax). The information relating to the PRACH repetition level may include information for selecting the PRACH repetition level (e.g., reference symbol received power (RSRP), reference symbol received quality (RSRQ), information relating to a threshold of a path loss). The information relating to the PRACH repetition level may be included in the random access preamble selection information.

Figure 3:
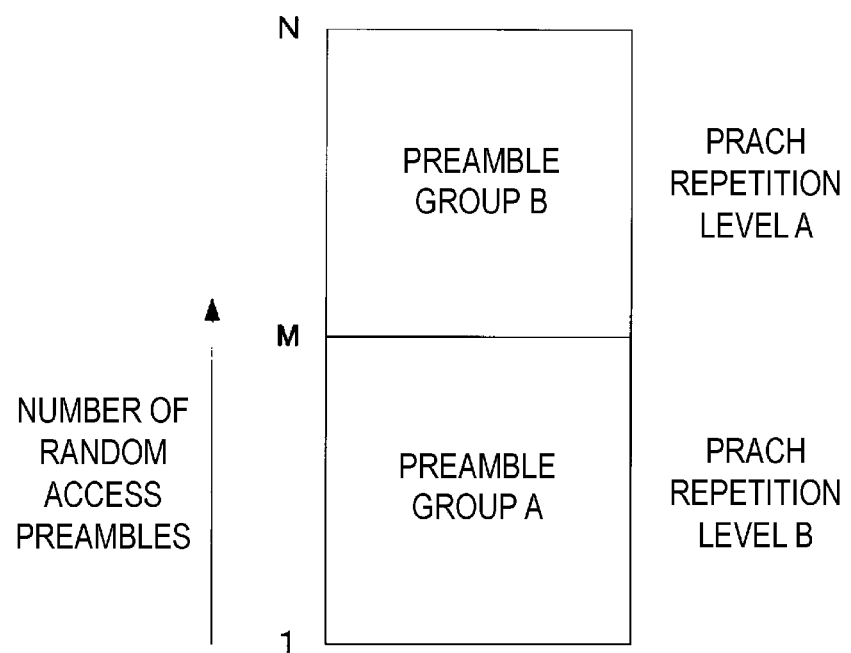
FIG. 3 is a diagram illustrating an example of a random access group according to an embodiment of the present invention.

The random access preamble selection information may include group information of the random access preambles (e.g., information on the number of random access preambles of each group), and information indicating a relationship between the group information of the random access preamble and the repetition level as illustrated in FIG. 3.

The random access preamble selection information may include the total number N of the random access preambles the MTCUE 3-1 can select, the number M of the random access preambles in a preamble group A or the number (N-M) of the random access preambles in a preamble group B, and information of the repetition level corresponding to each group. The number of the preamble groups may be three or more.

The information relating to the maximum number of transmissions of the random access preamble may be the maximum number of transmissions to the number of attempts for one repetitive transmission.

Multiple pieces of the information relating to the maximum number of transmissions of the random access preamble, information relating to the random access response message reception, information relating to the message 3 transmission, and information relating to the contention resolution message reception may be formed corresponding to the repetition levels of the random access preamble.

Information relating to the random access procedure for the mobile station device 1-1 includes random access channel configuration information including physical random access channel (PRACH) allocation information and random access preamble generation information, and random access common configuration information including random access preamble selection information, transmit power information of the random access preamble, information relating to the maximum number of transmissions of the random access preamble, information relating to the random access response message reception, information relating to the message 3 transmission, and information relating to the contention resolution message reception.

The random access common configuration information of the system information received by the mobile station device 1-1 and the random access common configuration information of the system information broadcasted to the MTCUE 3-1 may be independent from each other and different from each other.

The MTCUE 3-1, after receiving the system information for the MTCUE, configures a parameter included in the system information. The MTCUE 3-1 configures a mode (operation) for transmission and reception through repetition (hereinafter, referred to as a repetition mode). The RRC layer in the MTCUE 3-1 configures the repetition mode on the basis of configuration received from the base station device 5.

The MTCUE 3-1 performs the random access procedure in order to connect to the base station device 5. The MAC layer in the MTCUE 3-1 performs the random access procedure. The random access procedure in a case that the repetition mode is configured in the MTCUE 3-1 is described below.

The MAC layer in the MTCUE 3-1 configures the random access common configuration information. The MAC layer in the MTCUE 3-1 initializes a parameter relating to the random access procedure or the like. For example, a preamble transmission counter indicating the number of transmissions of the random access preamble (or the number of attempts of the random access preamble) is set to one. A buffer for the message 3 transmission is flushed (deleted).

Next, random access resource selection processing for the random access preamble transmission is performed. A case that the message 3 is not transmitted, in other words, a case of a first-time random access preamble transmission (an initial attempt of the random access preamble transmission) is described. The MAC layer in the MTCUE 3-1 selects the PRACH repetition level on the basis of a downlink radio channel (or downlink path loss), and configures the selected PRACH repetition level in a temporary PRACH repetition level.

The MAC layer in the MTCUE 3-1 configures the maximum number of transmissions at the PRACH repetition level (e.g., preambleTransMax_r1) corresponding to the temporary PRACH repetition level. The MAC layer in the MTCUE 3-1 selects a preamble group corresponding to the temporary PRACH repetition level.

The MAC layer in the MTCUE 3-1 may first select the preamble group, and then, select the temporary PRACH repetition level.

Next, a case that the message 3 is retransmitted, in other words, a case of retransmission of the random access preamble (a reattempt of the random access preamble transmission) is described. The MAC layer in the MTCUE 3-1, in a case of the first-time random access preamble transmission (or in a case of an attempt of the first-time random access preamble transmission) at the configured temporary PRACH repetition level, configures the maximum number of transmissions at the PRACH repetition level corresponding to the temporary PRACH repetition level. The MAC layer in the MTCUE 3-1 selects a preamble group corresponding to the temporary PRACH repetition level.

The MAC layer in the MTCUE 3-1, not in the case of the first-time random access preamble transmission (or not in the case of the attempt of the first-time random access preamble transmission) at the configured temporary PRACH repetition level, selects the preamble group used for the random access preamble transmission corresponding to a first-time message 3 transmission.

After selecting the preamble group, the MAC layer in the MTCUE 3-1 selects at random a random access preamble from the random access preambles belonging to (classified into) the selected preamble group.

The MAC layer in the MTCUE 3-1 selects a random access channel (PRACH) available for transmission. The random access channel (PRACH) available for transmission may be a head random access channel (PRACH) starting the repetitive transmission. The MAC layer in the MTCUE 3-1 calculates a received power of the random access preamble assumed in the base station device 5.

The MAC layer in the MTCUE 3-1 notifies the physical layer in the MTCUE 3-1 of a preamble ID of the selected random access preamble, the selected random access channel (PRACH), the temporary PRACH repetition level (or the number of repetitions corresponding to the temporary PRACH repetition level), the RA-RNTI (random access response identification information), and the calculated received power of the random access preamble.

The physical layer in the MTCUE 3-1 uses the random access preamble ID to generate the random access preamble. The physical layer in the MTCUE 3-1 uses the received power of the random access preamble to calculate a transmit power of the random access preamble.

The physical layer in the MTCUE 3-1 transmits the generated random access preamble to the selected random access channel (PRACH) with the calculated transmit power. The physical layer in the MTCUE 3-1 transmits the random access preamble by the number of repetitions corresponding to the temporary PRACH repetition level.

Then, after the random access preamble transmission, the physical layer in the MTCUE 3-1 monitors the RA-RNTI during the random access response window using the physical downlink control channel (PDCCH) or the enhanced physical downlink control channel (E-PDCCH). If the physical layer in the MTCUE 3-1 detects the RA-RNTI in the physical downlink control channel (PDCCH) or the enhanced physical downlink control channel (E-PDCCH), the physical layer decodes the physical downlink control channel shared channel (PDSCH). The physical layer in the MTCUE 3-1 notifies the MAC layer in the MTCUE 3-1 of the random access response message obtained by the decoding.

The physical layer in the MTCUE 3-1 may try to receive the physical downlink shared channel (PDSCH) transmitted by way of a downlink resource region corresponding to a radio resource (allocation information) of the physical random access channel (PRACH) for the random access preamble transmitted without using the RA-RNTI.

The physical layer in the MTCUE 3-1 performs the reception processing through repetition to the reception processing on the random access response message. In other words, the physical layer in the MTCUE 3-1 performs the reception processing through repetition to the physical downlink control channel (PDCCH), the enhanced physical downlink control channel (E-PDCCH), and/or the physical downlink control channel shared channel (PDSCH). The number of repetitive receptions may be configured corresponding to the temporary PRACH repetition level.

The MAC layer in the MTCUE 3-1 performs processing as below in a case of being notified of the random access response message reception by the physical layer in the MTCUE 3-1. If the random access response message includes a random access preamble ID corresponding to the transmitted random access preamble, the MAC layer in the MTCUE 3-1 determines a success in receiving the random access response message. The MAC layer in the MTCUE 3-1 processes the transmission timing information (transmission timing command) included in the random access response message.

The MAC layer in the MTCUE 3-1 processes the PDSCH/PUSCH repetition level command in a case that the repetition mode is set and the random access response message includes the information indicating the PDSCH/PUSCH repetition level (PDSCH/PUSCH repetition level command). The MAC layer in the MTCUE 3-1 notifies the physical layer in the MTCUE 3-1 of the uplink grant included in the random access response message.

In a case that the random access preamble ID is notified through the random access instruction by the base station device 5 and the MAC layer in the MTCUE 3-1 does not select the random access preamble, the MAC layer in the MTCUE 3-1 determines a success in the random access procedure.

In a case that the random access response message is not received during the random access response window, or in a case that the received random access response message does not include the preamble ID corresponding to the transmitted random access preamble, the MAC layer in the MTCUE 3-1 determines an unsuccess in receiving the random access response message.

In the case of determining the unsuccess in receiving the random access response message and a notification of power ramping suspension is not received from the physical layer in the MTCUE 3-1, the preamble transmission counter is incremented by one.

In a case that the value of the preamble transmission counter exceeds the maximum number of transmissions of the random access preamble (in a case of preambleTransMax_r1+1) at the configured temporary PRACH repetition level and the temporary PRACH repetition level is at the maximum repetition level (RepetitionLevelMax), the MAC layer in the MTCUE 3-1 notifies the higher layer (e.g., the RRC layer in the MTCUE 3-1) of a random access problem.

In a case that the value of the preamble transmission counter exceeds the maximum number of transmissions of the random access preamble (in a case of preambleTransMax_r1+1) at the configured temporary PRACH repetition level and the temporary PRACH repetition level is not at the maximum repetition level (RepetitionLevelMax), one is added to the temporary PRACH repetition level. In other words, the temporary PRACH repetition level is increased by one level. The preamble transmission counter is configured to one. The MAC layer in the MTCUE 3-1 performs again the random access resource selection processing in order to retransmit the random access preamble.

In a case that the value of the preamble transmission counter does not exceed the maximum number of transmissions of the random access preamble (in a case of preambleTransMax_r1+1) at the configured repetition level, the MAC layer in the MTCUE 3-1 performs again the random access resource selection processing in order to retransmit the random access preamble.

The RRC layer in the MTCUE 3-1, in a case of being notified of the random access problem by the MAC layer in the MTCUE 3-1, determines a radio link failure and performs the connection re-establishment procedure.

The base station device 5 performs the reception processing of the random access preamble and the transmission processing of the random access response on an assumption that the MTCUE 3-1 performs the above transmission processing of the random access preamble and the above reception processing of the random access response.

The base station device 5 varies the number of repetitive receptions of the random access preamble depending on the preamble ID to detect the random access preamble transmitted from the MTCUE 3-1.

After detecting the random access preamble, the base station device 5 calculates the uplink transmission timing for the MTCUE 3-1 from the received random access preamble, creates the random access response message including the transmission timing information including the calculated transmission timing, the uplink grant for the MTCUE 3-1 to transmit the message 3, the preamble ID of the received random access preamble, and the temporary C-RNTI, and repeatedly transmits the physical downlink shared channel (PDSCH) including the random access response message. The number of repetitive transmissions of the random access response message is configured depending on the received random access preamble.

The base station device 5 may include, in the random access response message, the repetition levels of the PDSCH reception and the PUSCH transmission, or the numbers of repetitions of the PDSCH reception and the PUSCH transmission for the MTCUE 3-1 after the random access response reception. Alternatively, the base station device 5 may include, in the random access response message, the number of repetitive transmissions of the message 3 transmission and the number of repetitive receptions of the contention resolution reception for the MTCUE 3-1.

The physical layer in the MTCUE 3-1 transmits the message 3 on the basis of the uplink grant. If the random access response message includes the PDSCH/PUSCH repetition level command, the number of repetitive transmissions of the message 3 may be configured to the number of repetitions corresponding to the PDSCH/PUSCH repetition level specified in the random access response message. If the random access response message does not specify the PDSCH/PUSCH repetition level, the number of repetitive transmissions of the message 3 may be configured to the number of repetitions corresponding to the temporary PRACH repetition level.

The MAC layer in the MTCUE 3-1 starts the contention resolution timer once the message 3 is transmitted. A timer value of the contention resolution timer may be selected depending on the temporary PRACH repetition level. The timer value of the contention resolution timer may be selected depending on the PDSCH/PUSCH repetition level.

The contention resolution timer may be started at a first-time transmission of the repetitive transmission of the message 3. Alternatively, the contention resolution timer may be started at a last time transmission of the repetitive transmission of the message 3.

The MAC layer in the MTCUE 3-1 is notified by the physical layer in the MTCUE 3-1 of the PDCCH reception. If the received PDCCH includes the temporary C-RNTI and a corresponding contention resolution ID is included in the scheduled PDSCH, or if the received PDCCH includes the C-RNTI for the MTCUE 3-1 itself and the received PDCCH includes the uplink grant, the MAC layer in the MTCUE 3-1 determines a success in the contention resolution and stops the contention resolution timer.

In the case of determining the success in the contention resolution, the MAC layer in the MTCUE 3-1 presumes a success in the random access procedure to flush the HARQ buffer for the message 3. In the case of the success in the random access procedure, the MAC layer in the MTCUE 3-1 may use the temporary PRACH repetition level as the PRACH repetition level or a reference repetition level.

If the contention resolution timer expires before receiving the contention resolution, the MAC layer in the MTCUE 3-1 determines an unsuccess in the contention resolution. In the case of determining the unsuccess in the contention resolution, the MAC layer in the MTCUE 3-1 flushes the HARQ buffer for the message 3.

The preamble transmission counter is incremented by one. In a case that the value of the preamble transmission counter equals to the maximum number of transmissions of the random access preamble (preambleTransMax_r1+1) at the configured temporary PRACH repetition level and the temporary PRACH repetition level is at the maximum repetition level (RepetitionLevelMax), the MAC layer in the MTCUE 3-1 notifies the higher layer (RRC layer) of a random access problem.

In the case that the value of the preamble transmission counter equals to the maximum number of transmissions of the random access preamble (preambleTransMax_r1+1) at the configured temporary PRACH repetition level and the temporary PRACH repetition level is not at the maximum repetition level (RepetitionLevelMax), one is added to the temporary PRACH repetition level. In other words, the temporary PRACH repetition level is increased by one level. The preamble transmission counter is configured to one. The MAC layer in the MTCUE 3-1 performs again the random access resource selection processing in order to retransmit the random access preamble.

The base station device 5 performs the reception processing of the message 3 and the transmission processing of the contention resolution on an assumption that the MTCUE 3-1 performs the above transmission processing of the message 3 and the above reception processing of the contention resolution.

If the base station device 5 receives the message 3, the base station device 5 transmits the contention resolution to the MTCUE 3-1. The repetitive reception of the message 3 and the repetitive transmission of the contention resolution are performed by the number of repetitions corresponding to the PDSCH/PUSCH repetition level indicated by the PDSCH/PUSCH repetition level command. In a case of not being notified of the PDSCH/PUSCH repetition level command, the base station device 5 performs the message 3 reception and the contention resolution transmission by the number of repetitions at the repetition level corresponding to the random access preamble.

Reception processing on the information indicating the PDSCH/PUSCH repetition level (PDSCH/PUSCH repetition level command) is described below. The PDSCH/PUSCH repetition level is controlled (or managed) using the repetition level timer. While the repetition level timer is running, the PDSCH/PUSCH repetition level indicated by the PDSCH/PUSCH repetition level command is valid.

The information indicating the PDSCH/PUSCH repetition level (PDSCH/PUSCH repetition level command) is notified as the MAC control information (MAC control element) or notified as those included in the random access response message. The case that the MAC layer in the MTCUE 3-1 receives the PDSCH/PUSCH repetition level command as the MAC control information (MAC control element) is described below.

The MAC layer in the MTCUE 3-1 configures the PDSCH/PUSCH repetition level to a value of the PDSCH/PUSCH repetition level indicated by the PDSCH/PUSCH repetition level command. The MAC layer in the MTCUE 3-1 notifies the physical layer in the MTCUE 3-1 of the set PDSCH/PUSCH repetition level. The MAC layer in the MTCUE 3-1 starts or restarts the repetition level timer.

Next, the case that the MAC layer in the MTCUE 3-1 receives the PDSCH/PUSCH repetition level command through the random access response message is described below.

If the transmitted random access preamble is not the random access preamble selected by the MAC layer in the MTCUE 3-1, in other words, if the random access preamble is notified through the random access instruction, the MAC layer in the MTCUE 3-1 configures the PDSCH/PUSCH repetition level to a value indicated by the PDSCH/PUSCH repetition level command in the random access response message. The MAC layer in the MTCUE 3-1 notifies the physical layer in the MTCUE 3-1 of the configured PDSCH/PUSCH repetition level. The MAC layer in the MTCUE 3-1 starts or restarts the repetition level timer.

If the repetition level timer is not running, the MAC layer in the MTCUE 3-1 configures the PDSCH/PUSCH repetition level to a value indicated by the random access response message. The MAC layer in the MTCUE 3-1 notifies the physical layer in the MTCUE 3-1 of the configured PDSCH/PUSCH repetition level. The MAC layer in the MTCUE 3-1 starts the repetition level timer.

In the case of determining an unsuccess in the contention resolution, the MAC layer in the MTCUE 3-1 may stop the repetition level timer. If the repetition level timer is not running, the MAC layer in the MTCUE 3-1 may configure the PDSCH/PUSCH repetition level to a default value. The default value in this case may be notified in the system information. The default value may be a predefined value.

The value of the repetition level timer may be notified in the system information or individually notified. A value of the transmission timing timer may be substituted for the value of the repetition level timer.

In a case that the PDSCH/PUSCH repetition level is configured, the physical layer in the MTCUE 3-1 performs, by the number of repetitions corresponding to the PDSCH/PUSCH repetition level, the reception processing on the physical downlink control channel (PDCCH), the enhanced physical downlink control channel (E-PDCCH) and the physical downlink shared channel (PDSCH), and the transmission processing on the physical uplink control channel (PUCCH) and the physical uplink shared channel (PUSCH).

The base station device 5 may include, in the system information, the information relating to the PDSCH/PUSCH repetition level including the number of repetitions corresponding to the PDSCH/PUSCH repetition level, and broadcast the system information to the MTCUE 3-1. The base station device 5 may notify the MTCUE individually of the information relating to the PDSCH/PUSCH repetition level.

The information relating to the PDSCH/PUSCH repetition level may include information relating to the maximum repetition level, the number of repetitions corresponding to the PDSCH/PUSCH repetition level, and the value of the repetition level timer.

Figure 4:
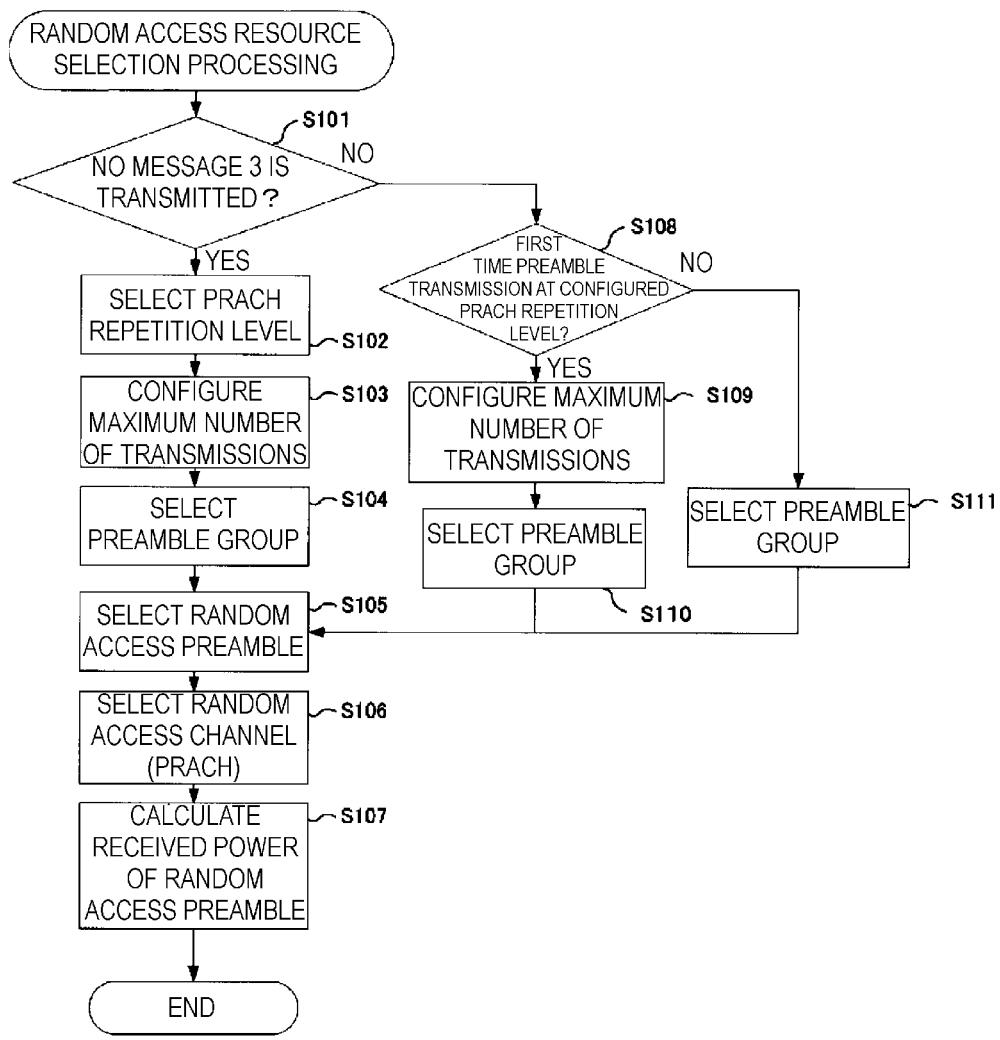
FIG. 4 is a diagram illustrating an example of random access resource selection processing for a random access preamble transmission according to an embodiment of the present invention.

The random access resource selection processing for the random access preamble transmission in the MAC layer in the MTCUE 3-1 is specifically described with reference to FIG. 4.

First, the MAC layer in the MTCUE 3-1 determines whether no message 3 is transmitted, in other words, the MAC layer in the MTCUE 3-1 determines whether or not the first-time random access preamble transmission (or the initial attempt of the random access preamble transmission) is performed (S101). If no message 3 is transmitted (in a case of Yes at S101), the MAC layer in the MTCUE 3-1 selects the PRACH repetition level on the basis of the downlink radio channel (or the downlink path loss) (S102). The MAC layer in the MTCUE 3-1 configures the temporary PRACH repetition level to the selected PRACH repetition level.

Then, the MAC layer in the MTCUE 3-1 configures the maximum number of transmissions (preambleTransMax_r1) at the PRACH repetition level corresponding to the temporary PRACH repetition level (S103). The MAC layer in the MTCUE 3-1 selects a preamble group corresponding to the temporary PRACH repetition level (S104).

After selecting the preamble group, the MAC layer in the MTCUE 3-1 selects at random a random access preamble from the random access preambles in the selected preamble group (S105).

Then, the MAC layer in the MTCUE 3-1 selects a random access channel (PRACH) available for transmission (S106). The MAC layer in the MTCUE 3-1 calculates a received power of the random access preamble assumed in the base station device 5 (S107).

If the message 3 is retransmitted, in other words, in a case of retransmission of the random access preamble (reattempt of the random access preamble transmission) (in a case of No at S101), the MAC layer in the MTCUE 3-1 determines whether or not the first-time random access preamble transmission (or the initial attempt of the random access preamble transmission) at the configured temporary PRACH repetition level is performed (S108).

In the case of the first-time random access preamble transmission at the configured temporary PRACH repetition level (in a case of Yes at S108), the MAC layer in the MTCUE 3-1 configures the maximum number of transmissions at the PRACH repetition level corresponding to the temporary PRACH repetition level (S109).

The MAC layer in the MTCUE 3-1 selects a preamble group corresponding to the temporary PRACH repetition level (S110). Then, the MAC layer in the MTCUE 3-1 performs processing of selecting the random access preamble (S105), selecting the random access channel (PRACH) (S106), and calculating the receive power of the random access preamble (107).

Not in the case of the first-time random access preamble transmission (or not in the case of the attempt of the first-time random access preamble transmission) at the configured temporary PRACH repetition level (in a case of No at S108), the MAC layer in the MTCUE 3-1 selects the preamble group used for the random access preamble transmission corresponding to the first-time message 3 transmission (S111).

Figure 5:
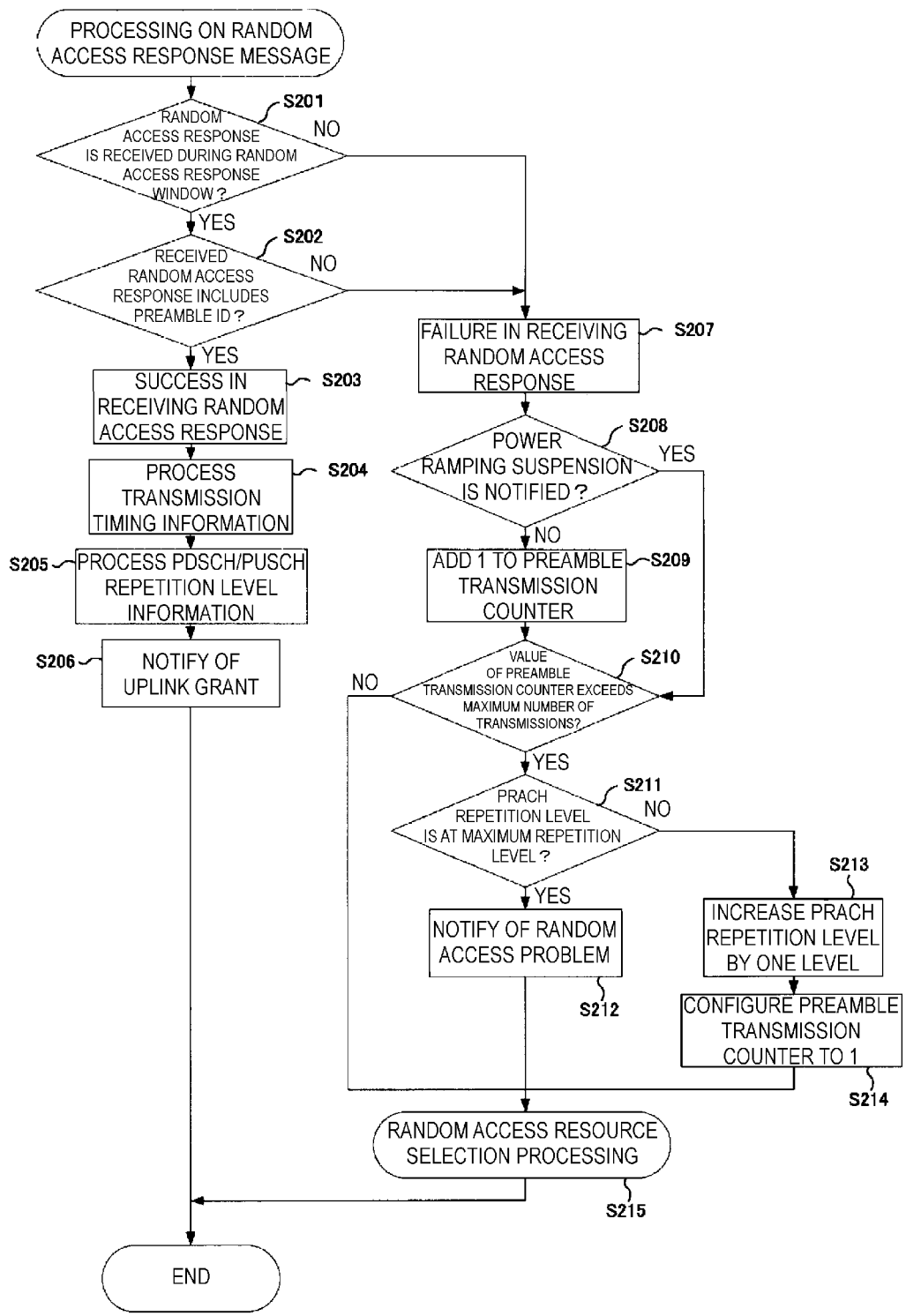
FIG. 5 is a diagram illustrating an example of processing on a random access response message according to an embodiment of the present invention.

The processing on the random access response message in the MAC layer in the MTCUE 3-1 is specifically described with reference to FIG. 5.

The MAC layer in the MTCUE 3-1 determines whether or not the random access response message is received during the random access response window (S201). In a case of receiving the random access response message during the random access response window (in a case of Yes at S201), the MAC layer in the MTCUE 3-1 determines whether or not the random access response message includes a preamble ID corresponding to the transmitted random access preamble (S202).

If the random access response message includes the preamble ID (in a case of Yes at S202), the MAC layer in the MTCUE 3-1 determines a success in receiving the random access response message (S203). The MAC layer in the MTCUE 3-1 processes the transmission timing information (transmission timing command) included in the random access response message transmission (S204).

Then, the MAC layer in the MTCUE 3-1 processes the information indicating the PDSCH/PUSCH repetition level (PDSCH/PUSCH repetition level command) included in the random access response message (S205). The MAC layer in the MTCUE 3-1 notifies the physical layer in the MTCUE 3-1 of the uplink grant included in the random access response message (S206).

In a case of not receiving the random access response message during the random access response window (in a case of No at S201), the MAC layer in the MTCUE 3-1 determines an unsuccess in receiving the random access response message (S207). In other words, the MAC layer in the MTCUE 3-1 determines a failure in receiving the random access response message.

Then, the MAC layer in the MTCUE 3-1 checks whether or not the notification of power ramping suspension is received from the physical layer in the MTCUE 3-1 (S208). In a case of not receiving the notification of power ramping suspension from the physical layer in the MTCUE 3-1 (in a case of No at S208), the MAC layer in the MTCUE 3-1 increments the preamble transmission counter by one (S209).

The MAC layer in the MTCUE 3-1 determines whether or not a value of the preamble transmission counter exceeds the maximum number of transmissions of the random access preamble at the configured temporary temporary PRACH repetition level (S210). In a case of not receiving the notification of power ramping suspension from the physical layer in the MTCUE 3-1 (in a case of Yes at S208), the MAC layer in the MTCUE 3-1 determines the preamble transmission counter (S210). If the value of the preamble transmission counter does not exceed the maximum number of transmissions of the random access preamble at the configured temporary PRACH repetition level (in a case of No at S210), the MAC layer in the MTCUE 3-1 performs the random access resource selection processing described above (S215).

If the value of the preamble transmission counter exceeds the maximum number of transmissions of the random access preamble at the configured temporary PRACH repetition level (in a case of Yes at S210), the MAC layer in the MTCUE 3-1 checks whether or not the temporary PRACH repetition level is at the maximum repetition level (RepetitionLevelMax) (S211).

If the temporary PRACH repetition level is at the maximum repetition level (in a case of Yes at S211), the MAC layer in the MTCUE 3-1 notifies the higher layer of a random access problem (S212). Then, the MAC layer in the MTCUE 3-1 performs the random access resource selection processing described above (S215).

If the temporary PRACH repetition level is not at the maximum repetition level (in a case of No at S211), the MAC layer in the MTCUE 3-1 adds one to the temporary PRACH repetition level (S213). In other words, the MAC layer in the MTCUE 3-1 increases the temporary PRACH repetition level by one level. Then, the MAC layer in the MTCUE 3-1 configures the preamble transmission counter to one (S214). The MAC layer in the MTCUE 3-1 performs the random access resource selection processing described above (S215).

Figure 6:
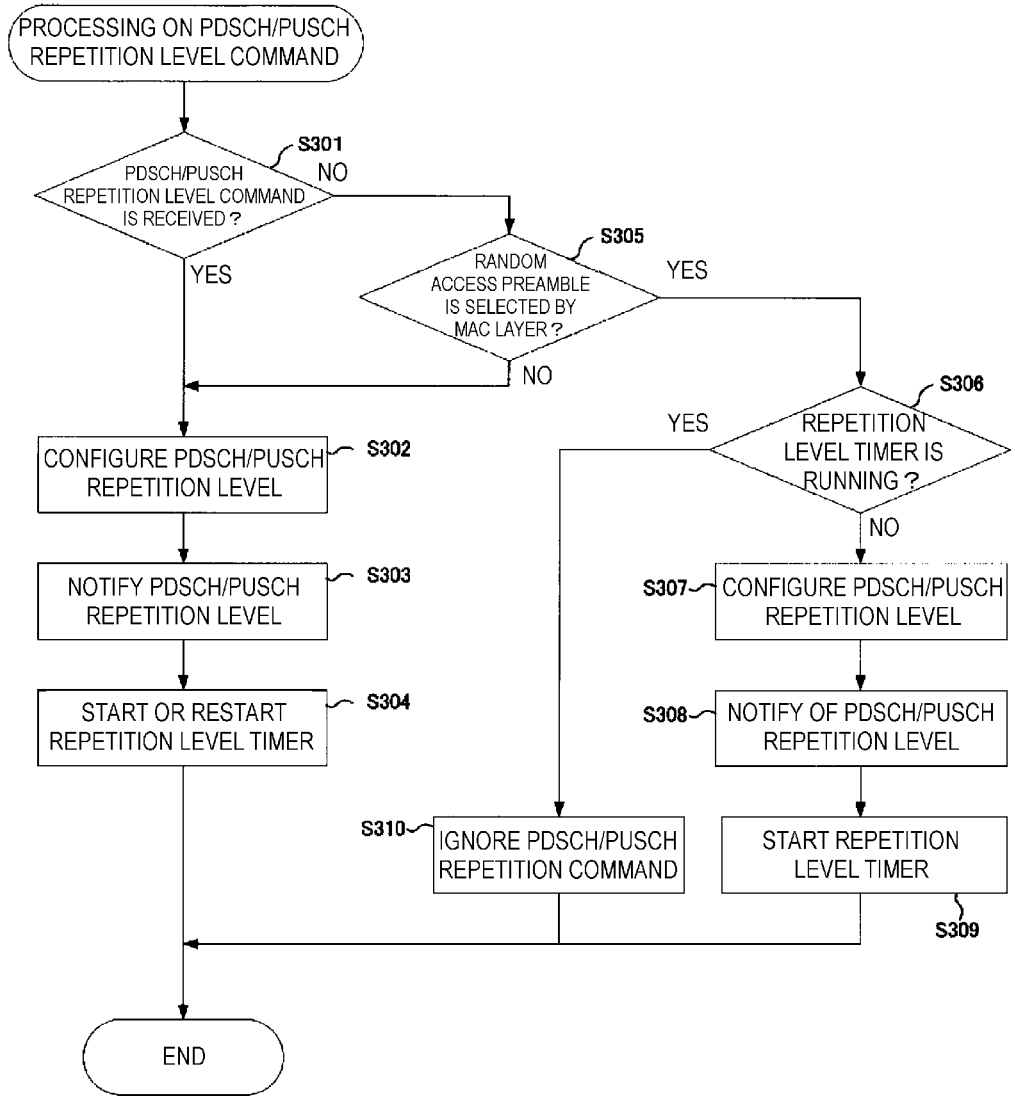
FIG. 6 is a diagram illustrating an example of processing on a PDSCH/PUSCH repetition level command according to an embodiment of the present invention.

The processing on the information indicating the PDSCH/PUSCH repetition level (hereinafter, referred to as the PDSCH/PUSCH repetition level command) in the MAC layer in the MTCUE 3-1 is specifically described with reference to FIG. 6.

The MAC layer in the MTCUE 3-1 determines whether or not the PDSCH/PUSCH repetition level command is received as the MAC control information (MAC control element) (S301). In a case of receiving the PDSCH/PUSCH repetition level command as the MAC control information (in a case of Yes at S301), the MAC layer in the MTCUE 3-1 configures the PDSCH/PUSCH repetition level to a value of the PDSCH/PUSCH repetition level indicated by the PDSCH/PUSCH repetition level command (S302).

The MAC layer in the MTCUE 3-1 notifies the physical layer in the MTCUE 3-1 of the configured PDSCH/PUSCH repetition level (S303). Then, the MAC layer in the MTCUE 3-1 starts or restarts the repetition level timer (S304).

In a case of receiving the PDSCH/PUSCH repetition level command through the random access response message (in a case of No at S301), it is checked whether or not the transmitted random access preamble is the random access preamble selected by the MAC layer in the MTCUE 3-1 (S305).

If the transmitted random access preamble is not the random access preamble selected by the MAC layer in the MTCUE 3-1 (in a case of No at S305), the MAC layer in the MTCUE 3-1 performs processing of configuration the PDSCH/PUSCH repetition level (S302), notifying the PDSCH/PUSCH repetition level (S303), and starting or restarting the repetition level timer (S304).

If the transmitted random access preamble is the random access preamble selected by the MAC layer in the MTCUE 3-1 (in a case of Yes at S305), the MAC layer in the MTCUE 3-1 checks whether or not the repetition level timer is running (S306).

If the repetition level timer is not running (in a case of No at S306), the MAC layer in the MTCUE 3-1 configures the PDSCH/PUSCH repetition level to a value indicated by the random access response message (S307). The MAC layer in the MTCUE 3-1 notifies the physical layer in the MTCUE 3-1 of the set PDSCH/PUSCH repetition level (S308). Then, the MAC layer in the MTCUE 3-1 starts the repetition level timer (S309).

If the repetition level timer is running (in a case of Yes at S306), the MAC layer in the MTCUE 3-1 ignores the PDSCH/PUSCH repetition level command (PDSCH/PUSCH repetition level information) in the random access response message.

The base station device 5 also uses the repetition level timer to control (manage) the PDSCH/PUSCH repetition level for the MTCUE 3-1 similarly to the MTCUE 3-1.

In the case that the MTCUE 3-1 receives the PDSCH/PUSCH repetition level command as the MAC control information, the base station device 5 starts or restarts the repetition level timer.

In the case that the MAC layer in the MTCUE 3-1 receives the PDSCH/PUSCH repetition level command through the random access response message and the received random access preamble is not the random access preamble selected by the MAC layer in the MTCUE 3-1, in other words, in the case that the random access preamble is notified by the base station device 5 through the random access instruction, the base station device 5 starts or restarts the repetition level timer.

In the case that the MAC layer in the MTCUE 3-1 receives the PDSCH/PUSCH repetition level command through the random access response message and the repetition level timer is not running, the base station device 5 starts the repetition level timer.

The case that the MTCUE 3-1 receives the PDSCH/PUSCH repetition level command may be a case that the base station device 5 transmits the PDSCH/PUSCH repetition level command. The case that the MTCUE 3-1 receives the PDSCH/PUSCH repetition level command may be a case that the base station device 5 receives a positive response (ACK) from the MTCUE 3-1 in response to the PDSCH/PUSCH repetition level command.

In a case that the repetition level varies during performing the random access procedure, the MTCUE 3-1 may stop the random access procedure or start again the random access procedure from the beginning. For example, the MTCUE 3-1 may measure the downlink radio quality (e.g., path loss)

during performing the random access procedure, and if the PRACH repetition level in use or the PDSCH/PUSCH repetition level is different from a PRACH repetition level obtained by measuring the downlink radio quality, the MTCUE 3-1 may stop the random access procedure or use the obtained repetition level to perform again the random access procedure.

In the above description, the MTCUE may be classified depending on a type of the mobile station device. The mobile station device may be classified into two types such that a mobile station device carrying out the operation of the above mobile station device 1-1 may be classified into a first type of mobile station device and a mobile station device carrying out the operation of the above MTCUE 3-1 may be classified into second type. The mobile station device may also be classified into two types such that a mobile station device carrying out the operation of the above mobile station device 1-1 may be classified into the first type of mobile station device, and the mobile station devices carrying out the operation of the above MTCUE 3-1 may be classified into second and third types which are different in the number of repetitions configured therein. The mobile station devices of the first type may be classified into categories of a category 0 to a category 13, the mobile station devices of the second type may be classified into a category X other than the categories for the first type of mobile station device, and the mobile station devices of the third type may be classified into a category Y other than the categories for the first and second types of mobile station device.

The content described using the specific numerical value is merely an example of a numerical value used for the sake of the description, and any suitable value may be used.

The embodiment of the present invention has been described in detail above referring to the drawings, but the specific configuration is not limited to the above embodiments and various amendments can be made to a design that fall within the scope that does not depart from the gist of the present invention.

Furthermore, according to the embodiment, the mobile station device supporting machine type communication is described as one example of a terminal device or a communication device, but the present invention is not limited to this, and can be applied to a terminal apparatus or a communication apparatus, such as a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The MTCUE 3-1 and the base station device 5 in the embodiment are described using the functional block diagrams for the sake of the description, but the mobile station device and the base station device may be controlled by recording on a computer-readable recording medium a program for realizing the functions of the respective units in the MTCUE 3-1 and base station device 5 or a part of these functions, and causing a computer system to read the program recorded on the recording medium for execution. The "computer system" here includes an OS and hardware components such as a peripheral device.

Furthermore, the "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and additionally may be configured to realize the functions described above in combination with a program already recorded in the computer system.

The functional blocks used in each embodiment described above may be realized as an LSI that is typically an integrated circuit. The functional blocks may be individually realized as chips, or may be partially or completely integrated into a chip. The circuit integration technique is not limited to LSI, and the integrated circuits for the functional blocks may be realized as dedicated circuits or a multi-purpose processor. Furthermore, if with advances in semi-conductor technology, a circuit integration technology with which an LSI is replaced appears, it is also possible to use an integrated circuit based on the technology.

The embodiments of the invention have been described in detail thus far with reference to the drawings, but the specific configuration is not limited to the embodiments. Other designs and the like that do not depart from the essential spirit of the invention also fall within the scope of the patent claims. In other words, this specification of the present application is described for the purpose of illustration, and puts no limitation on the embodiments of the present invention.

As some aspects in the present invention, the following measures may be taken.

(1) A radio communication system according to an aspect of the present invention is a radio communication system in which a base station device and a terminal device are configured to communicate with each other and, the terminal device is configured to perform a random access procedure, in which the base station device is configured to notify the terminal device of random access common configuration information including the maximum number of transmissions corresponding to a repetition level for each repetition level, and a MAC layer in the terminal device is configured to notify an RRC layer in the terminal device of a random access problem in a case that a first counter exceeds the maximum number of transmissions corresponding to the repetition level and the repetition level is at the maximum repetition level, and the RRC layer in the terminal device is configured to perform connection re-establishment processing in a case that the RRC layer is notified of the random access problem by the MAC layer in the terminal device.

(2) In the radio communication system according the above aspect of the present invention, the MAC layer in the terminal device has a first counter incremented at least in a case that an unsuccess in receiving the random access response is considered and a notification of power ramping suspension is not received from the physical layer in the terminal device.

(3) A terminal device according to an aspect of the present invention is a terminal device configured to communicate with a base station device and perform a random access procedure, in which, a MAC layer in the terminal device is configured to notify an RRC layer in the terminal device of a random access problem in a case that a first counter exceeds the maximum number of transmissions corresponding to a repetition level and the repetition level is at the maximum repetition level.

(4) The MAC layer in the terminal device according the above aspect of the present invention is further configured to increase the repetition level in a case that the first counter exceeds the maximum number of transmissions corresponding to the repetition level and the repetition level is not at the maximum repetition level.

(5) The MAC layer in the terminal device according the above aspect of the present invention is further configured to increment the first counter at least in a case that an unsuccess in receiving the random access response is considered and a notification of power ramping suspension is not received from a physical layer in the terminal device.

(6) A base station device according to an aspect of the present invention is a base station device configured to communicate with a terminal device, and the base station device is configured to notify the terminal device of random access common configuration information including the maximum number of transmissions corresponding to a repetition level for each repetition level, and assume that the repetition level for the terminal device varies depending on the maximum number of transmissions corresponding to the repetition level, and a success or failure in receiving a random access response by the terminal device.

(7) A radio communication method according to an aspect of the present invention is a radio communication method applied to a terminal device, the terminal device is configured to communicate with a base station device and perform a random access procedure, the method including the steps of notifying a higher layer of a random access problem in a case that a first counter exceeds the maximum number of transmissions corresponding to a repetition level and the repetition level is at the maximum repetition level, and increasing the repetition level in a case that the first counter exceeds the maximum number of transmissions corresponding to the repetition level and the repetition level is not at the maximum repetition level.

(8) The radio communication method according the above aspect of the present invention further includes the step of incrementing the first counter at least in a case that an unsuccess in receiving the random access response is considered and a notification of power ramping suspension is not received from a lower layer.

(9) An integrated circuit according to an aspect of the present invention is an integrated circuit applied to a terminal device, the terminal device being configured to communicate with a base station device and perform a random access procedure, the integrated circuit including a first unit configured to notify a higher layer of a random access problem in a case that a first counter exceeds the maximum number of transmissions corresponding to a repetition level and the repetition level is at the maximum repetition level, and a second unit configured to increase the repetition level in a case that the first counter exceeds the maximum number of transmissions corresponding to the repetition level and the repetition level is not at the maximum repetition level.

(10) The integrated circuit according the above aspect of the present invention further includes a third unit configured to increment the first counter at least in a case that an unsuccess in receiving the random access response is considered and a notification of power ramping suspension is not received from a lower layer.

The present invention can be applied to at least mobile phones, personal computers, tablet-type computers, and the like.

REFERENCE SIGNS LIST 1-1 to 1-3 Mobile station device
3-1 to 3-3 MTCUE
5 Base station device
101, 201 Data generation unit
103, 203 Transmission data storage unit
105, 205 Transmission HARQ processing unit
107, 207 Transmission processing unit
109, 209 Radio unit
111, 211 Reception processing unit
113, 213 Reception HARQ processing unit
115, 215 MAC information extraction unit
117, 217 PHY control unit
119, 219 MAC control unit
121, 221 Data processing unit
123, 223 RRC control unit

The invention claimed is:

1. A radio communication system in which a base station device and a terminal device are configured to communicate with each other and the terminal device is configured to perform a random access procedure, wherein:

the base station device includes:
 a first processor; and
 a first memory in electronic communication with the first processor, the first memory storing instructions executable by the first processor to notify the terminal device of random access information including:
  (i) information for selecting a level for determining a repetition number, (ii) a first number and a last number of preambles included in a group corresponding to the level, and (iii) a number of attempts of preamble transmission configured for each level; and the terminal device includes:
 a second processor; and
 a second memory in electronic communication with the second processor, the second memory storing instructions that are executable by the second processor to:
  select, in a MAC layer, the level based on a received downlink radio quality, and
  perform, in the MAC layer, processing of increasing the level in a case that a first counter exceeds a maximum of the number of attempts of transmission, the maximum being configured for the level.

2. A terminal device configured to communicate with a base station device and perform a random access procedure, wherein:

the terminal device includes:
 a processor; and
 a memory in electronic communication with the processor, the memory storing instructions executable by the processor to:
  receive, from the base station device, random access information including: (i) information for selecting a level for determining a repetition number, (ii) a first number and a last number of preambles included in a group corresponding to the level, and (iii) a number of attempts of preamble transmission configured for each level,
  select, in a MAC layer, the level based on a received downlink radio quality, and
  perform, in the MAC layer, processing of increasing the level in a case that a first counter exceeds a maximum of the number of attempts of transmission, the maximum being configured for the level.

3. A base station device configured to communicate with a terminal device, wherein:
the base station device includes:
 a processor; and a memory in electronic communication with the processor, the memory storing instructions executable by the processor to:
notify the terminal device of random access information including: (i) information for selecting a level for determining a repetition number, (ii) a first number and a last number of preambles included in a group corresponding to the level, and (iii) a number of attempts of preamble transmission configured for each level.

4. A radio communication method applied to a terminal device configured to communicate with a base station device and perform a random access procedure, the radio communication method comprising the steps of:
receiving, from the base station device, random access information including: (i) information for selecting a level for determining a repetition number, (ii) a first number and a last number of preambles included in a group corresponding to the level, and (iii) a number of attempts of preamble transmission configured for each level;
selecting the level based on a received downlink radio quality; and
increasing the level by a MAC layer in the terminal device in a case that a first counter exceeds a maximum of the number of attempts of transmission, the maximum being configured for the level.

5. A radio communication method applied to a base station device configured to communicate with a terminal device, the radio communication method comprising:
notifying, by the base station device, the terminal device of random access information including: (i) information for selecting a level for determining a repetition number, (ii) a first number and a East number of preambles included in a group corresponding to the level, and (iii) a number of attempts of preamble transmission configured for each level.

6. The radio communication system according to claim 1, wherein:
the random access information further includes information indicating a relationship between the level and a timer value of a contention resolution timer, and
the second memory further stores an instruction that is executable by the second processor to select, in the MAC layer, the timer value of the contention resolution timer corresponding to the selected level.

7. The terminal device according to claim 2, wherein:
the random access information further includes information indicating a relationship between the level and a timer value of a contention resolution timer, and
the memory further stores an instruction that is executable by the processor further to select, in the MAC layer, the timer value of the contention resolution timer corresponding to the selected level.

8. The base station device according to claim 3, wherein:
the random access information further includes information indicating a relationship between the level and a timer value of a contention resolution timer.

9. The radio communication method according to claim 4, wherein:
the random access information further includes information indicating a relationship between the level and a timer value of a contention resolution timer, and
the radio communication method further comprises the step of selecting the timer value of the contention resolution timer corresponding to the selected level.

10. The radio communication method according to claim 5, wherein:
the random access information further includes information indicating a relationship between the level and a timer value of a contention resolution timer.

* * * * *